US010412630B2

(12) United States Patent
Olson

(10) Patent No.: US 10,412,630 B2
(45) Date of Patent: Sep. 10, 2019

(54) SYSTEM FOR ESTIMATING WIRELESS NETWORK LOAD AND PROACTIVELY ADJUSTING APPLICATIONS TO MINIMIZE WIRELESS NETWORK OVERLOAD PROBABILITY AND MAXIMIZE SUCCESSFUL APPLICATION OPERATION

(71) Applicant: Erlend Olson, Newport Beach, CA (US)

(72) Inventor: Erlend Olson, Newport Beach, CA (US)

(73) Assignee: Modulus Technology Solutions Corp., Philadelphia, PA (US)

( * ) Notice: Subject to any disclaimer, the term of this patent is extended or adjusted under 35 U.S.C. 154(b) by 0 days.

(21) Appl. No.: 15/884,670

(22) Filed: Jan. 31, 2018

(65) Prior Publication Data
US 2018/0332503 A1  Nov. 15, 2018

Related U.S. Application Data

(63) Continuation of application No. PCT/US2016/045028, filed on Aug. 1, 2016.

(60) Provisional application No. 62/199,841, filed on Jul. 31, 2015.

(51) Int. Cl.
| *H04W 28/08* | (2009.01) |
| *H04L 12/26* | (2006.01) |
| *H04W 24/08* | (2009.01) |
| *H04W 4/50* | (2018.01) |
| *H04W 24/06* | (2009.01) |

(52) U.S. Cl.
CPC .............. *H04W 28/08* (2013.01); *H04L 43/10* (2013.01); *H04W 4/50* (2018.02); *H04W 24/08* (2013.01); *H04W 24/06* (2013.01)

(58) Field of Classification Search
CPC ...... H04L 43/10; H04W 24/06; H04W 24/08; H04W 28/08; H04W 4/50
See application file for complete search history.

(56) References Cited

U.S. PATENT DOCUMENTS

| 7,567,504 B2 | 7/2009 | Darling et al. |
| 8,589,541 B2 | 11/2013 | Raleigh et al. |
| 8,812,659 B2 | 8/2014 | Mestemaker et al. |

(Continued)

Primary Examiner — Asad M Nawaz
Assistant Examiner — Berhanu D Belete
(74) Attorney, Agent, or Firm — Bonini IP Law, LLC; Frank J. Bonini, Jr.

(57) ABSTRACT

Systems, methods and devices for managing communications across a wireless network to maximize the operations for transmission and utilization of the network or portions thereof in conjunction with wireless devices and applications that involve communication of information over a wireless network by evaluating the existing load on the wireless network and modifying or reducing the forthcoming demand of a mobile device using the network. A management server on the wireless network utilizes information about a wireless device communication to generate an estimate of the remaining unused or available upload capacity of that portion of the wireless network serving the particular wireless mobile device. The wireless mobile device applications that utilize network communications may be regulated to adjust their operations to function within the reduced network capacity.

71 Claims, 13 Drawing Sheets

(56) References Cited

U.S. PATENT DOCUMENTS

| | | | |
|---|---|---|---|
| 2004/0268358 A1 | 12/2004 | Darling et al. | |
| 2006/0253416 A1* | 11/2006 | Takatsu | H04L 67/18 |
| 2008/0002576 A1* | 1/2008 | Bugenhagen | H04L 41/147 |
| | | | 370/229 |
| 2010/0082838 A1* | 4/2010 | Wang | H04L 47/10 |
| | | | 709/233 |
| 2011/0047215 A1* | 2/2011 | Guo | H04L 47/10 |
| | | | 709/204 |
| 2011/0131278 A1* | 6/2011 | Nieh | H04L 67/104 |
| | | | 709/204 |
| 2011/0276985 A1* | 11/2011 | Takatsu | H04L 67/18 |
| | | | 719/318 |
| 2012/0064908 A1* | 3/2012 | Fox | H04W 28/10 |
| | | | 455/452.2 |
| 2012/0272251 A1* | 10/2012 | Takatsu | H04L 67/18 |
| | | | 719/318 |
| 2014/0019543 A1* | 1/2014 | Hyun | H04L 67/104 |
| | | | 709/204 |
| 2014/0325086 A1* | 10/2014 | El-Beltagy | H04L 67/104 |
| | | | 709/231 |
| 2015/0071271 A1* | 3/2015 | Smedman | H04W 48/18 |
| | | | 370/338 |
| 2015/0181449 A1* | 6/2015 | Didenko | H04W 24/10 |
| | | | 455/67.11 |
| 2015/0257112 A1* | 9/2015 | Draznin | H04W 4/04 |
| | | | 455/115.3 |

\* cited by examiner

SYSTEM FOR ESTIMATING WIRELESS NETWORK LOAD AND PROACTIVELY ADJUSTING APPLICATIONS TO MINIMIZE WIRELESS NETWORK OVERLOAD PROBABILITY AND MAXIMIZE SUCCESSFUL APPLICATION OPERATION

CROSS-REFERENCE TO RELATED APPLICATIONS

This patent application claims the benefit under 35 U.S.C. 119 and 35 U.S.C. 120 of International application no. PCT/US2016/045028 filed on Aug. 1, 2016 and U.S. provisional application Ser. No. 62/199,841 filed on Jul. 31, 2015, entitled "System For Estimating Wireless Network Load and Proactively Adjusting Applications to Minimize Wireless Network Overload Probability and Maximize Successful Application Operation", the complete contents of which are herein incorporated by reference.

BACKGROUND OF THE INVENTION

1. Field of the Invention

The invention relates to methods, systems and devices for wireless communication and managing communications across a wireless network, where a system and devices are configured to maximize the operations for transmission and use of the network or portions thereof in conjunction with wireless devices and applications that involve communication of information over a wireless network.

2. Brief Description of the Related Art

Wireless systems for general public communications use today are often "cell" based. Referring to FIG. 1, in such systems, mobile phones or mobile devices (100) within a larger geographic region (101) are served by a distribution of fixed location local radio transceivers which provide two way wireless communications to the devices in sub-regions of the larger region (102). When the mobile phone or mobile device moves from one location to a new location (103), it may be served by a different local fixed radio transceiver in the wireless system (104).

Structurally, a simplified diagram of such a system appears in FIG. 2. In FIG. 2, a typical exemplary arrangement is illustrated, showing multiple Base Transceiver Stations (BTS, 200) which interface to mobile devices (207) over radio waves, are connected to a Base Station Controller (BSC, 201a, 201b), which are in turn aggregated under a Mobile Switching Center (MSC, 202). The MSC (202) may consist of many sub-blocks not shown, but ultimately the MSC typically provides two connections to the rest of the world, one being a two way circuit-switched network connection (203a, 203b) to the public switched telephone network (PSTN) (204) represented by the table phone icon, and the other being a two way packet or IP-based network connection (205a, 205b) to the Internet, represented in FIG. 2 by the computer icon (206). The system enables a suitably equipped mobile device (207) to thereby engage in both real-time voice communications directly to another telephone or mobile device (addressed via a traditional phone number via the PSTN (204)), as well as engage in two-way transfer of datagrams via the Internet to another device with a specific Internet-Protocol based address (206).

Many types of wireless networks, including "cell" type networks such as those indicated in FIG. 2, may have sub-zones within a sub-region. For example, referring to FIG. 1, the region covered by a single fixed wireless transceiver BTS (104 in FIG. 1) may be further divided up into sub-zones or sectors of number 3 or 6 zones, typically, in 120 degree or 60 degree swaths, as indicated by the dotted lines and the swept angles of coverage (104a, 104b, 104c). Wi-Fi type wireless services can also contain directional antenna capabilities, enabling same frequency channel reuse from the same fixed wireless transceiver to different mobile devices located at different radial angles from the orientation of the fixed wireless transceiver. Throughout this patent and explanation, the sub-region of coverage of a specific wireless service fixed location radio transceivers is generally not further divided into sub-zones or sectors, in order to avoid distracting detail. However all of the principles and points apply equally to sub-zones or sectors of sub-regions of a wireless network served through a fixed wireless antenna system as though they were treated individually in the same manner as sub-regions receive treatment in this patent.

Referring again to FIG. 2, when public-use cellular type wireless networks were originally conceived, they were designed for carrying circuit-switched voice traffic, and typically there may not have existed a packet or IP-based network connection capability (205a, 205b) to the internet (206) via the MSC (202). Voice traffic loads on a wired network have well known and predictable usage patterns based on over a century of industry experience in the construction and operation of circuit-switched wired telephone networks (PSTNs). Such usage patterns are well enough characterized that in many jurisdictions, phone companies who operate PSTNs are required under various laws (for example, Title 47 CFR Part 68 of the United States Code of Federal Regulations) to provide service to the general public with very high probability of access and success in communications conducted over the PSTN at any time. In fact, the fundamental operating model for all of modern telephony and public communications networks (whether ensconced in law or not) has been that the service provider will supply the necessary network support to enable a human user to engage in normal use of the communications network at any time on demand, without need for the user to obtain a-priori knowledge about the network's status, nor require the user to schedule desired use of the network around other network activities, because it is assumed that the network has sufficient resources to service the user at any time.

As such voice networks migrated from analog to digital, the data rates of voice communication ranged in the sub-100 kilo-bits-per-second range, typically from around 13 kilo-bits-per-second (GSM cell phone voice traffic rate) to 64 kilo-bits-per-second (for high quality digitized land-line-equivalent performance). This refers to the data rate per voice conversation occurring over the voice transport link indicated in FIG. 2 (203a, 203b).

However, as the mobile device (207) migrated from one principally configured to provide voice communications to one configured to provide both voice and data service (so-called smart phones), the number of applications and the amount of traffic devoted to connecting the mobile device (207) to internet servers and data-oriented applications (206) has skyrocketed and now far outpaces the amount of voice traffic transported by systems of the type depicted generally by FIG. 2. For example, a single user employing a personal smart phone to take a single full high definition color picture and transmit it over the internet to a friend who employs another wireless smart phone to view the picture would typically expect the wireless network to transmit the 750 kilo-byte picture to the other smart phone in seconds. 750 kilo-bytes is the equivalent of nearly 10 minutes of typical voice conversation traffic. Thus wireless network providers have modified the installed equipment of FIG. 2 to handle larger amounts of data traffic between the mobile device (207) and a server or application hosted on a computer on the internet (206) compared to voice traffic between the mobile device (207) and other voice equipment on the PSTN (204).

As public wireless networks have advanced to handle more data traffic, equipment in the wireless network is often configured to enable higher download speeds and point-to-multi-point download data transfers as compared to upload speeds. Referring now to FIG. 3, where the elements of FIG. 2 are contained within the Wireless Network Equipment (WNE) (300 and 301) for simplification, and the connection to the PSTN from FIG. 2 is not shown (that is, only the Internet connection (205a, 205b) out of the MSC (202) of FIG. 2 is indicated in FIG. 3, as connections 303b and 303d). In FIG. 3, upload speeds consisting of the overall throughput from the mobile device (307) via 303a and 303b to the server are typically slower than download speeds to the mobile device (307) from the server via 303d and 303c.

The reason that the WNE is often configured for asymmetric data throughput speeds is because human-initiated interactions with applications accessed over the internet most often consist of an upload request represented by a small amount of data (such as the request for a map, or a search term) followed by a download response represented by a larger amount of data (such as a map or map images or enumerated results in response to a search term) from servers connected to the internet responsive to that request. Another example of a common asymmetric activity on a public wireless network is the upload request by a user of a mobile device to access and/or watch a movie, followed by the download or streaming of the movie to the mobile device for the user to watch. These activities typically employ application software residing on the mobile device (307a) interacting with application software on a server or servers on the internet (306a).

The mobile device indicated in FIG. 1 (100), FIG. 2 (207) and FIG. 3 (307) is typically a so-called "Cellphone", a so-called "SmartPhone" or a so-called "Wireless SmartThing" or simply "SmartThing". Although there is no standard by which such mobile devices (307) can be precisely differentiated, in general a Cellphone only conducts audio conversation between humans or processes limited data-centric activities initiated by humans via the wireless network, and generally only has a limited screen for viewing by a human. A SmartPhone generally is capable of more advanced graphics for human visual interaction, and the execution of more advanced applications software (commonly called "Apps") which can act either autonomously, semi-autonomously or at the request of, or upon initiation by, a human, and in addition supports all of the applications uses typical of a Cellphone. A SmartThing (as the term shall be further used herein) is an abbreviated way to describe a wireless mobile device commonly construed as part of the "Internet of Things", where the mobile device acts as a remote sensor, which provides input or sensing functions to a software application (an "App") (306a) which is executed on a server (306) connected to the internet, and also connected to the mobile device via the wireless network. While "Cellphones" and "SmartPhones" may conduct autonomous or semi-autonomous activities (that is, execute software or code to transmit or receive datagrams over the WNE (300) pursuant to activities not initiated by a human), they are typically configured with extensive computing and display resources committed to human interfacing. In contrast, a SmartThing typically is configured to conduct mostly autonomous and semi-autonomous activities and may have no human interface whatsoever, or only limited human interfaces specific to a more defined function.

However, both SmartPhones and SmartThings may be extremely complex in internal function and autonomous capabilities. For example, they may have video recording and transmission capability. They may have the ability to sense various conditions, such as temperature, sound, motion, lights, time or location and then conduct or initiate activities or data transfers, according to a pre-stored program, or according to particular directives from a remote program on a server which may change or be updated from time-to-time.

Common to all types of mobile devices which are the subject of this document is the capability of the mobile device to interact over the wireless network. Typically, this requires that the mobile device have a radio-frequency transceiver (RF transceiver). Most wireless devices which are permitted on a public wireless network such as a cell network contain the facility within the RF transceiver to measure the received signal power from the BTS (200 in FIG. 2) or other fixed network wireless transceiver such as a so-called Wi-Fi hotspot. Such a capability is usually required in order for the RF transceiver to comply with various protocols implemented over the wireless interface between the BTS (200) or wireless transceiver and the mobile device (207).

Further common to all types of mobile devices which are the subject of this patent is the capability of the mobile device to at least minimally process a request initiated from application software (306a) running on a server (306) and return information about the state of the mobile device, without requiring a human to interact with the mobile device or necessarily permit each such request to be fulfilled as the request is made. SmartPhones and SmartThings today commonly include such capabilities, and several popular applications enable the intermittent or continuous reporting of the physical location of the mobile device, the intermittent or continuous reporting of the received signal strength of the mobile device with respect to the local BTS (200) or other transceiver serving it on the wireless network, as well as other intermittent or continuous reporting. Furthermore, SmartPhones and SmartThings often have the ability to initiate such activities autonomously by decision within the mobile device itself, or caused by some other event besides the request of a server.

With further respect to background, the amount of video being uploaded over wireless networks by wireless devices and applications supporting them is growing dramatically. However, this growth has presented certain drawbacks.

Modern SmartPhones continue to evolve as the essential communication device in the lives of many people all over the world, and as the predominant mobile device on public wireless networks which interface with humans. As the capabilities of electronics and sensor systems on mobile SmartPhone devices become more and more powerful, the ability of the mobile device to generate large amounts of useful upload data (303a and 303b in FIG. 3) is increasing rapidly. Also, the number of SmartThings connected to the internet via a wireless network connection, and which can initiate demands for wireless network resources autonomously, has now exceeded the number of humans on earth. The number and data transferred per day of SmartThing mobile devices connected over wireless public networks is presently growing much more rapidly than SmartPhone mobile devices connected over wireless public networks. Much of the data is in the form of video (moving pictures), including both delayed video and real-time video. Real-time video is now rapidly taking the place in people's lives that real-time voice conversation held for decades—that is, the primary means of personal real-time communication between humans over communications networks is migrating rapidly from voice to video (which includes voice with the moving images).

Mobile devices have the ability to nearly instantly demand substantial wireless network data transfer resources, either from a human-initiated activity, such as sending a picture or video clip, or from an autonomous or semi-autonomous activity (such as a SmartThing responding to a pre-programmed algorithm to send a picture of a secured area after detecting movement, or send data pertaining to some event it has detected having occurred such as a change in temperature). Furthermore, because of the extreme demands placed on a network to transceive real-time video and the lack of such requirements to be addressed with the existing legacy installed base of circuit-switched type networks (PTSN-type networks), such real-time demands today are met with packet-type or Internet Protocol datagram oriented networks. Wireless network data traffic is anticipated to be roughly 18 exabytes per month worldwide by the end of 2018, or approximately 7 terabytes per second, continuously. (See "Mobile data traffic is expected to explode 11-fold by 2018", Hamblen, M., *Computerworld*, Feb. 5, 2014) This is approximately 10 times the wireless network data traffic at the end of 2013, only 5 years prior. (Id.) A large portion of that data is anticipated to be video in nature and type, and much of that video is real-time video between people and place and people and other people.

A problem occurs for applications and users of wireless networks to transfer data and carry real-time video traffic when a set of circumstances is created whereby a large concentrated number of mobile devices are being serviced by a single BTS (200, in FIG. 2) or aggregated to a single MSC (202 in FIG. 2), and further, where such devices are requesting to upload data (303*a* and 303*b* in FIG. 3) or stream up video, as opposed to download data or downstream video. An example of such a situation is depicted in FIG. 4. In FIG. 4, a stadium (402) is filled with a hypothetical 50,000 patrons, each with their own individual SmartPhone (403). When one team scores a goal, suddenly many patrons may employ their SmartPhones to take a picture or video clip or share the experience via a real-time video link with another, and upload large amounts of data at a high rate to applications hosted on servers on the internet via the local BTS (401) or via a Wi-Fi wireless connection which covers the area occupied by the stadium (400). Such an instant demand can easily overwhelm the local equipment and local servicing capabilities of the wireless network. In such a situation, there is presently no way to enforce any order or priority of access and upload and, as a result, the wireless network equipment becomes overloaded, inefficient and even can potentially even stop serving all mobile devices.

Furthermore, it is not cost effective for a wireless network provider to over-equip a wireless network coverage point for only occasional extreme demand use. The sub-optimal solution which has been implemented often is that network providers and others simply warn mobile device users not to use their SmartPhone devices in the stadium (see "Clogged cell networks during big events: Examining potential solutions to a serious problem", Soper, T., Geekwire, Sep. 10, 2014) or even in the general area of an event, except for text messaging, which is often the exact time and place when they may want to use the SmartPhone for video interactions the most. For example, it has been observed that even popular events, which plan for spectator attendance, are not able to handle Smart Phone traffic. (See, e.g., "Olympics Wireless Network Gets Overloaded on Day 1: Organizers Ask Fans Not to Tweet", Kapustka, Paul, *MSR/Mobile Sports Report*, Jul. 29, 2012) ("Well, despite lots of planning and press releases, it turns out that the folks behind the wireless networks at the London Olympics weren't prepared for the SmartPhone revolution. According to a Reuters story today, fans effectively shut down TV coverage from the men's cycling road race by overwhelming the wireless network with their communications, leading the games organizers to ask fans not to tweet so much.")

Another set of circumstances in which the wireless network can be overloaded without warning by upload requests from SmartThing mobile devices is indicated in FIG. 5 and relates to a wearable device or SmartThing application. Many police officers now in many jurisdictions are required to wear a so-called police body camera. Such body cameras can be equipped and configured to automatically begin recording video when an officer starts running, for example. They can also be configured to alert a command center and provide streaming video over a wireless network to a commander to enhance situational awareness and enable a police commander to deploy additional resources in urgent situations. See, for Example, my U.S. Patent Application Ser. No. 62/185,355, the complete disclosure of which is herein incorporated by reference. In the example in FIG. 5, a number of gendarmes (504) with wireless body worn video cameras which are enabled (504*a, b, c, d*) are in pursuit of a bank robber (503) who has just robbed a bank (502). As more gendarmes converge on the robber (505, 506), each with their own police body camera (505*a*, 506*a*) streaming video, the demand the additional wireless police body cameras video upload streams place on a single wireless network BTS (501) increases, and may overwhelm the wireless network's capacity, and the real-time video feeds to the commander (not shown) from the gendarmes' police body cameras may become impaired or may cease altogether.

Because the wireless police body cameras are unable to anticipate both the existing demand on a wireless network BTS (501), as well as the additional demand that other nearby wireless police body cameras might be making on the same wireless network BTS (501), they cannot reduce their demands on the network in an ordered way, and in a way which still supplies useful video to the commander. With video in particular, there are often stages of quality which demand less transmission or upload resources. For example, it is preferable to humans to have a reduced frame rate video to view, rather than no video at all. Or, as another example, it is preferable to have fewer video frames at higher resolution than more video frames which are below a subjective resolution where a human is able to reliably identify another person. Therefore, especially in the case of video, and in this specific example, there is a need to potentially scale the video quality and quantity of frames in congested situations, rather than suffer the risk that the network becomes overloaded and fails to service all connections altogether. The situation with video and especially with streaming video, is thus different than the transfer of a file-type datagram, where the file is not generally useful until every bit in it has been transferred in its entirety successfully to its destination.

Another drawback is illustrated in FIG. 5, where the commander who is receiving the real-time video feed from the police body cameras in the field on each gendarme cannot be made generally aware that the particular BTS (501) is in danger of being overloaded and therefore may not act to override any settings on the police body cameras to say reduce the video frame rate, or turn off specific mobile device police body camera streams with an override command, if such capability exists. The result could be that all live video feed from all of the gendarmes' mobile device police body cameras ceases, and may in fact cease at the most critical time: when the gendarmes are converged on the bank robber and the upload load on the wireless network is at a peak from one direction.

Another circumstance related to humans using SmartPhones and autonomous SmartThing mobile devices acting to overload a wireless network is indicated in FIG. 6. In this example, a fire has occurred in a building (602). Many autonomous devices deployed in the building may sense a problem in the building (for example, fire suppression sprinkler systems) and, if connected over the wireless network BTS (601) serving the local region (600), may begin uploading data (602a) to alert building management systems or fire department authorities (not shown). The building data may be useful for first responders to understand the nature and extent of the fire. As first responders arrive on the scene (604) their autonomous body cameras (604a) begin streaming video to local or distant command centers via the BTS (601) to facilitate situational awareness, which places additional demands on the upload capacity of the local wireless network. As the conflagration develops, people may begin to congregate (603) to watch the activities. Many in the crowd may have their own SmartPhones (603a), and as individuals begin taking pictures or video and uploading over the same wireless network resources, the wireless network becomes further strained. The result could be that the data from SmartThings in the building, along with data and video from first responders, along with data and video from passersby, all act to overload the wireless network and the local wireless network fails at precisely the time it is most needed and most useful. (See "It's Official: Verizon Concedes Wireless Network Overload", Eule, A., *Barron's*, Nov. 16, 2013)

Furthermore, most applications using data as the principle information communication between a mobile device and a server in packetized form over a wireless network (as opposed to a voice connection using a circuit-switched connection over the wireless network) are Internet Protocol address based and are not aware of the physical location of the mobile device for the purposes of the communications. That is, the communication occurs based on the Internet Protocol address of the mobile device and the server, even if the application is itself a location-based application (such as providing a map to a person to find their way to a physical address). Therefore the portion of most applications designed today that are responsible for communications and data transport are generally unaware and unresponsive to changing congestion situations over the local wireless network to which the mobile device may be interacting with the server.

A further result is that wireless service providers deny the ability of certain high upload demand mobile devices or applications to operate on their networks, in order to avoid overload of the wireless network and loss of service to all other users. Examples include continuous streaming upload video devices and applications, and other sensors that generate a large volume of data.

A "heat map" of general estimated network load signal strength has been provided to show coverage and help a user (a human using a wireless device) direct that user toward a stronger signal. One example of this is OpenSignal, which shows a heat map for network load signal strength for a number of networks. Another example is OpenCellID. The stated purpose of the OpenCellID is to ascertain the location of a mobile device based on what cell tower it reports.

Currently, the method that has been widely implemented to attempt to reduce wireless network congestion (both upload and download) has been to limit a mobile device's absolute data usage over some long period of time (say, 30 days), however that limitation has been shown to have little or no effect in ameliorating congestion on a particular wireless network portion at any given place or time.

SUMMARY OF THE INVENTION

Systems, methods and devices are provided for managing communications across a wireless network, where a system and devices are configured to maximize the operations for transmission and use of the network or portions thereof in conjunction with wireless devices and applications that involve communication of information over a wireless network.

According to preferred embodiments, the system, method and device is provided for managing resources, such as, for example, mobile-device applications which demand significant upload resources from a wireless network. Preferred embodiments are configured to evaluate the condition of the existing load on the wireless network and potentially modify or reduce the forthcoming demand that a mobile device using the network would place on the network.

According to some embodiments, the modification or reduction of the forthcoming demand that a mobile device using the network would place on the network may be managed by re-timing the forthcoming demand to another time when the load on the wireless network is reduced, or is expected to be reduced.

The system, method and device facilitate communications taking place on a network, and in particular, uploading of video over wireless networks from SmartPhones and SmartThings. The system, method and device are configured to maximize the potential for transmission, including of live streaming video. Video is not an all-or-nothing type of transmission or datagram, like a traditional file that is largely useless until it is completely transmitted to a recipient. The present system, method and device are configured to provide preferential viewing for video, for example, such as communication of video that may be viewed at a reduced frame rate with good resolution, in contrast to regular frame rates with good resolution but where large gaps exist in time in the video stream. The device, system and method may be used to provide video communication that may be viewed as video with reduced frame rates with acceptable resolution rather than regular frame rates with poor resolution. Embodiments of the method, device and system may implement communications of a wireless mobile device (such as a Smart Phone or Smart Thing device) over a network to reduce the data rate demands, including demands of video, transmitted over wireless networks while still producing a useful end result. The reduction of the data demands from the implementation of the invention, facilitates providing an alternative to network usage situations where there is either a complete drop-out of the video or a loss of support for all mobile devices connected to a wireless network for some time, owing to the overload of the wireless network.

According to some preferred embodiments, the method, system and device are configured to anticipate the loading of the wireless network in the vicinity of the mobile device which is uploading the video or sensor data. The system, method and device anticipate the load on the network or portion thereof serving the mobile device. According to some preferred embodiments, the wireless mobile device is provided with one or more mobile device applications that upload video or sensor data over the wireless network, and these device applications preferably are configured to be able to anticipate the loading of the wireless network in the vicinity of the mobile device which is uploading the video or sensor data. The enhancement of the video or sensor data that the mobile device is delivering over the network may be implemented by the mobile device, and may be autonomously or semi-autonomously regulated or controlled.

According to some embodiments, the wireless mobile device may be configured with an application that receives information as to the status condition of the upload capacity of the wireless network or portion thereof serving the wireless mobile device. Preferably, the upload capacity information is for the immediate time that the device desires to make the communication of video or other data. The device preferably includes a processing unit which processes the upload information as to the capacity. Device applications that operate to send video (e.g., live streaming video) or data, such as sensor data, may themselves, or their outputs be regulated to adjust the video based on the demands of the network capacity at the time the transmission is made. According to preferred embodiments, the method, system and device may be configured with an application that a mobile device may implement to manage the device by controlling parameters of video, such as real-time video, which may include regulating one or more parameters, such as, for example, video frame rate, resolution, color or other factors pertaining to the real-time video. The factors preferably are adjusted to reduce upload data rate requirements when a wireless network is more congested or has the potential to become congested, thereby reducing the probability that the real-time video will drop-out due to the overloading of the wireless network.

According to some embodiments, the method, device and system may be implemented in wireless mobile devices and wireless networks. A first application may be formed in hardware, software, firmware, or some combination thereof on a wireless mobile device. The wireless mobile device may be configured to communicate over a wireless network. The wireless mobile device may communicate with a network component, such as a second software component or firmware application on a management server over a wireless network. The second component that communicated with the mobile device over the network, may for example be embodied in a management server. The second component or management server management preferably is configured to act to continuously, intermittently or when demanded, make (i) a measurement of the signal strength of the signal received by the mobile wireless device, or (ii) a measurement of the signal power in the specific frequency bands being employed by the wireless device in its communications mode over the wireless network, or (iii) both i and ii, and (iv) time of day, and (v) location either by using the global positioning system to determine latitude and longitude or (vi) by ascertaining the unique identifier of the fixed antenna and sub-zone or sector of that antenna and/or transceiver providing wireless service to the mobile device, or (vii) both v and vi, and (viii) optionally a test block of data. The second software or firmware on the second component or management server forms an estimate of the remaining unused or available upload capacity of that portion of the wireless network serving the particular wireless mobile device, or one near it. The term 'upload' refers to the direction where data travels from the wireless mobile device, over the wireless network and to a server, for the purpose of providing other applications an estimate of the available or unused upload capacity of the wireless network portion serving a particular mobile device. The implementation of the system, method and devices may also be carried out to determine download capacity, in a similar manner, taking into account the wireless mobile devices that are consuming resources of the wireless network download capacity. Similarly, the downloading may be regulated by adjustment of parameters of the data, or by re-adjusting the time at which the download may take place, or both.

According to preferred embodiments, a mobile wireless device is configured to transmit data comprising a heartbeat. The heartbeat preferably is transmitted at a predetermined time, and according to some embodiments, the predetermined time is determined by the mobile device. The heartbeat may be a data block. The mobile device processor may be instructed with software that contains instructions to generate the heartbeat data block by assembling the heartbeat data parameters. Preferably, the heartbeat data parameters provide information that may be evaluated to determine a condition of a wireless network service the mobile device. For example, according to one preferred embodiment, the heartbeat is assembled by inserting at least two data parameters. One data parameter may be a fixed time period specific to the wireless mobile device, representing a time delay (Td) between the time the insertion of the Time of Transmission time (Tt) and final assembly of same into the heartbeat data block is complete. Another data parameter may be the time the upload of the heartbeat data block is requested by the wireless mobile device processing unit to be sent to the management server via the wireless mobile device transceiver. Alternatively, or in addition, the management server may be configured to request a heartbeat from the mobile device. In some circumstances, the wireless mobile device is instructed by the management server to transmit a heartbeat at a delayed time, specified in the future. The wireless mobile device, through an application or other software, may be instructed to refrain from transmitting said heartbeat until the specified time.

According to embodiments of the invention, one or more databases may be constructed or utilized. The second component, such as the management server, may be configured with an application, or software, such as Wireless Load and Discovery Management Software (WLDMS). The management server may be instructed by the WLDMS operative on or in connection therewith, to process data to create a database of the estimated wireless network upload capacity available to one or more wireless mobile devices operating on the network.

The system, method and device may be utilized in connection with the managing network subscriber usage. For example, the network provider, may sell or lease capacity on its network, and the provider, or others (e.g., capacity purchasers or lessees) may resell capacity, for example in the form of minutes, with the sales being made under a restriction that the system, method and device for managing the capacity and usage of capacity be implemented. According to some embodiments, the purchaser or lessee may require that subscribers download and/or enable the application, such as the WLDS function, to report to the management server, such as the WLDMS, on the subscriber's mobile device so that the wireless network provider receives greater assurance that the applications employed will have less chance of deleterious effect on the network.

According to some alternate embodiments, implementation of the system, method and device may be made so that the management server, such as the WLDMS, may regulate priority of usage over the network. For example, by private contract some users, who pay more for minutes, may be given priority over others for upload capacity when conditions are constrained. An example of this would be a professional journalist who pays extra to make sure the journalist has priority to upload real-time video when covering unfolding events, even over other passersby or bystanders who may be attempting to upload video at the same time. Another example is a security force or police force which is given priority over other users on a network to upload pictures (i.e. evidence) or video (real-time face recognition applications), etc. over occasional or non-emergency uses. A further example would be a professional athlete (say, a downhill skier) who wears a body camera and uploads his athletic performance from his view point real-time as its happening, where his real-time video upload is prioritized because it is actually or potentially generating ancillary revenue.

The present system, method and devices enhance the success of all mobile device users having applications properly serviced over the wireless network. The invention provides an improvement and alternative to the mobile device simply making upload demands that contribute to the further degradation or demise of the wireless network in congested high demand situations. The method, system and devices of the invention alleviate congestion of the network, and promote improvements of the utilization of the network capacity. The mobile device may be configured with to prevent the transient overload of the wireless network. Rather than having to over-provision the network, with excess capacity that may only be needed at certain times, and rather than simply refusing to permit certain mobile devices or applications on the wireless network, the system, method and devices disclosed may operate and regulate through configurations on the device, as well as through operations by a remote management server in communication with the device, and conduct communications operations in view of the network capacity available for the communication (e.g., an upload or download of information).

These and other advantages are provided by the invention. The above objects and features may be implemented together or separately, and one or more of the features may be combined in one or more embodiments.

BRIEF DESCRIPTION OF THE DRAWING FIGURES

DETAILED DESCRIPTION OF THE PREFERRED EMBODIMENTS

Figure 7:
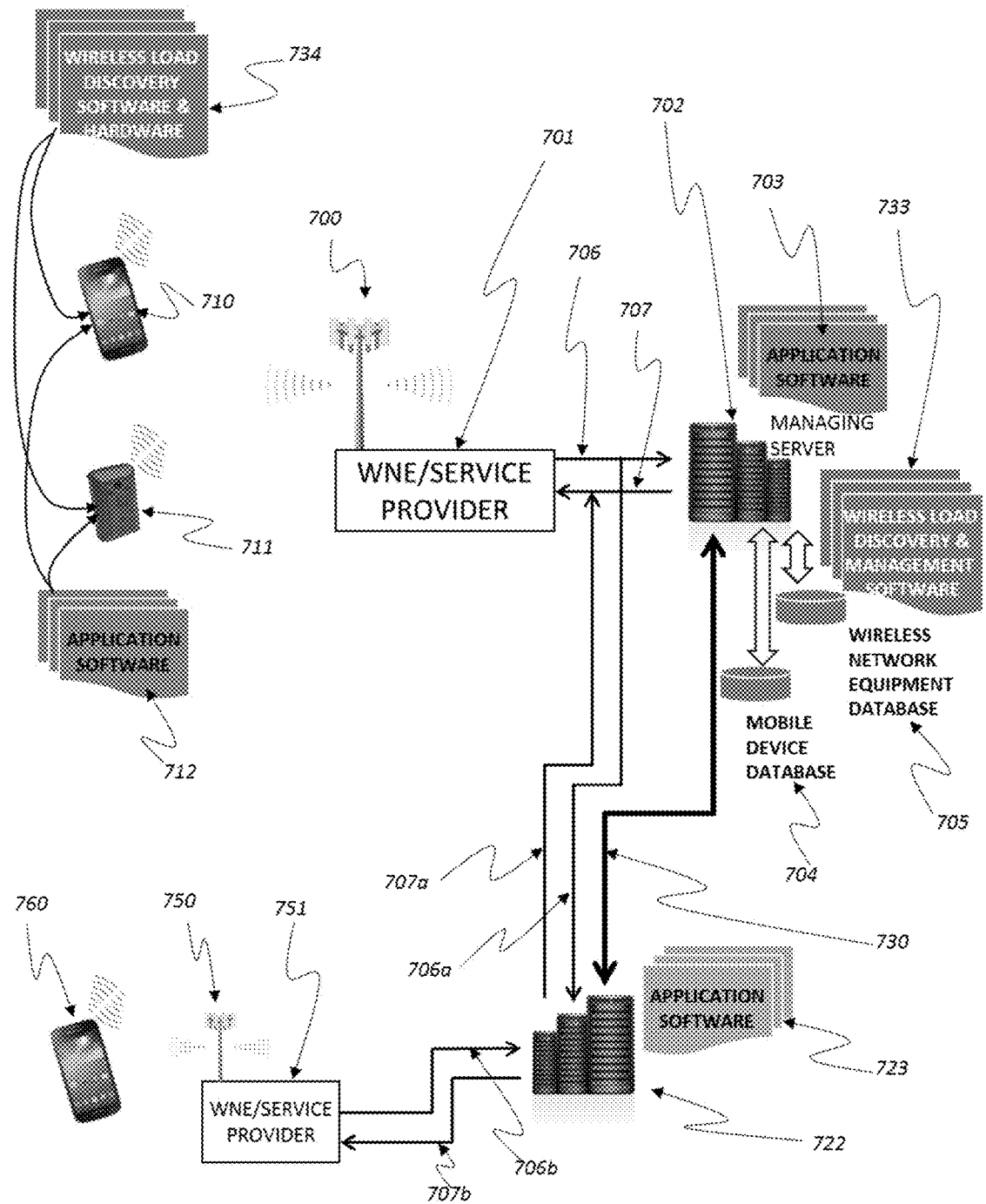
FIG. 7 is a schematic diagram illustrating an exemplary embodiment of a system, method and devices, according to the present invention, showing a wireless network provider where a management server is provided in connection with a mobile device, and where the network capacity management system is employed.

Referring to FIG. 7, the present invention is embodied in a system which consists of a wireless network provider with equipment (701) providing a wireless two-way connection from a fixed transceiver (700) to mobile devices which are either SmartPhone-type mobile devices (710) or purpose-built SmartThings-type mobile devices (711) which can run both application software (712) which is either pre-loaded at manufacture or downloaded after manufacture, as well as special sub-application software, firmware or hardware or a combination of the three (734), which is called Wireless Load Discovery Software and Hardware. The mobile devices are connected to a server (702) via the wireless network equipment (700, 701) so that upload (706) and download (707) connections may be created, which may be one-and-the-same physical connection between the server and the wireless network equipment over the internet or a private network connection. Application software on the server (703) acts to control and manage the interaction of one or more applications (712) on the SmartPhone (710) or SmartThing (711) and thereby manage the data and video uploads of the SmartPhone or SmartThing to the server (702) and its attendant application(s) software (703).

The first server (702) which serves or manages certain applications (703), hereafter called the Managing Server may also optionally communicate with other servers (722) which may serve other applications (723) over the same interface to the same wireless network equipment and/or service provider (706a, 707a) or other similar interface (706b, 707b) to an alternate WNE/Service Provider (751) communicating with a SmartPhone (760) or SmartThing (not shown) over a different wireless connection (750). In the case where the Managing Server (702) is connected to a second server (722), a means of communication is also provided between the two (730) which is independent of the connection between the Managing Server (702) and the mobile devices (710, 711), and may be in the form of a standardized Application Programming Interface (API).

The Managing Server (702) also maintains databases, the first of which is called the Mobile Device Database (MDD, 704) and, optionally, it also maintains a Wireless Network Equipment Database (WNED, 705).

In the preferred embodiment, the mobile devices (711, 710) are employed via special software or firmware or hardware (734) present in the mobile device, or any combination of them, to measure the local wireless network upload capacity and load prior to those same mobile devices either manually, semi-autonomously or autonomously being engaged to upload a large amount of data or a high rate of data such as video, over the wireless network (700, 701). Software on the Managing Server (702) maintains in the MDD (704) the current estimate of the wireless network upload capacity available to specific wireless mobile devices of which it is aware (710, 711) over local wireless network connections (700, 701), where the estimates in the data base are specific to the time, place (including sub-region or sub-zone or latitude and longitude) where the mobile devices are operating. The Wireless Load Discovery Software (733) on the Managing Server (702) drives the collection of the load information from SmartPhone and SmartThing Mobile devices, and also provides a rating upon request to other applications software as to the ability of a specific device at its present time and place with respect to the wireless network to which it is connected to upload the data at a certain rate. Then, a decision can be made by the applications software whether or not to enable the upload, or modify it suitably, depending on BOTH the nature of the application (such as, for example, video) AND the existing upload capacity estimate formed by the process described above.

For example, if the a mobile device is located in an area with high upload congestion, the Managing Server (702) via the Wireless Load Discovery and Management Software (733) can report that the wireless network supporting that mobile device has limited additional capacity. Then before the mobile device begins an upload or a large amount of data or data such as video at a high rate, the application software on the server (703) can cooperate with the application software on the mobile device (711, 710) to reduce the load to the wireless network by, for example, reducing the frame rate of the video, or rescheduling the activity altogether, thereby preventing overload of the wireless network in a controlled manner.

The upload capacity estimate created and entered in the MDD (704) can be transient or persistent with any time constant that is suitable for applications which the method supports. Typically, the measured upload capacity information derived in near real-time from the measurements employing the mobile devices (710, 711 and 734) which is managed by the Wireless Load Discovery and Management Software (WLDMS) (733), is compared with a data base of the known capacity of the network in the Wireless Network Equipment Database (705) for a specific area or specific BTS (700 or 750), including possibly a specific sub-zone of the sub-region covered by a BTS in a cell system network.

Over time, as many mobile devices accumulate measurements in and around a specific BTS (711, 750) over various times, and report them to the WLDMS (733), that information can also be aggregated such that a new sub-data base can be created inside the WNED (705) which contains more information about the limitations of a specific wireless network upload capacity with respect to a specific area covered by a specific BTS (700,750), as opposed to the advertised maximum capacity of the BTS (700, 750).

Applications which might require upload of considerable amounts of data or upload at high data rates (i.e. video) from the mobile devices with which they interact can either be directly supplied with load information by the WLDMS (733) on the same Managing Server (703) or they can subscribe to a service provided by the Managing Server (703) which enables other applications and servers to understand the upload capacity of any particular wireless network connection at any particular time through the information aggregated by and maintained by the WLDMS (733). The ability to permit the ordered querying of the WLDMS database(s) for load information about the current capacity of a particular sub-region or sub-zone of a wireless network enables a wide array of applications to cooperate with each other to effectively manage the load on a particular BTS or wireless network anywhere the operator of the WLDMS chooses to both (a) maintain such information and (b) enable or distribute the necessary cooperating capability in the form of Wireless Load Discovery Software and Hardware (734) on mobile devices.

Also, in order to effectuate the spread of the capability of Wireless Load Discovery Software and Hardware (734) on more and more devices in the world, providing better and better information on the unused load capacity in any particular place at any particular time, in the event the Managing Server does not have immediate load information pertaining to the local region where an inquiry has been initiated, say for example the region served by the wireless service site (750), it can request the subject mobile device (760) to obtain the necessary Wireless Load Discovery Software, at a minimum, so that wireless network available capacity information may be obtained from it in one or more of the manners described above, to ascertain local wireless network upload load information in an area or with a BTS or fixed wireless network transceiver location about which the WLDMS (733) was previously unaware.

Figure 8:
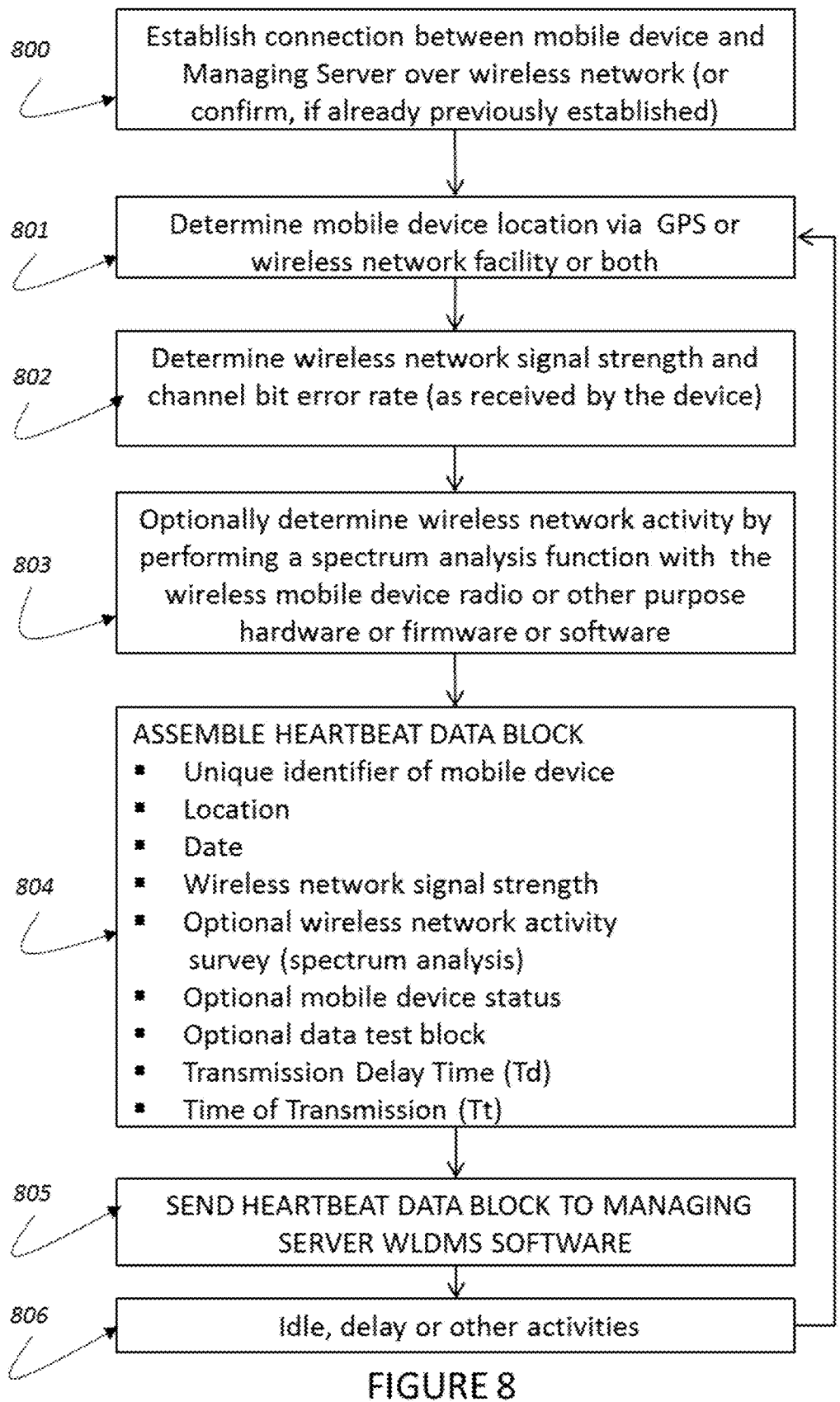
FIG. 8 is flow diagram illustrating a preferred exemplary embodiment of operations implemented by the system, method and devices.
Figure 9:
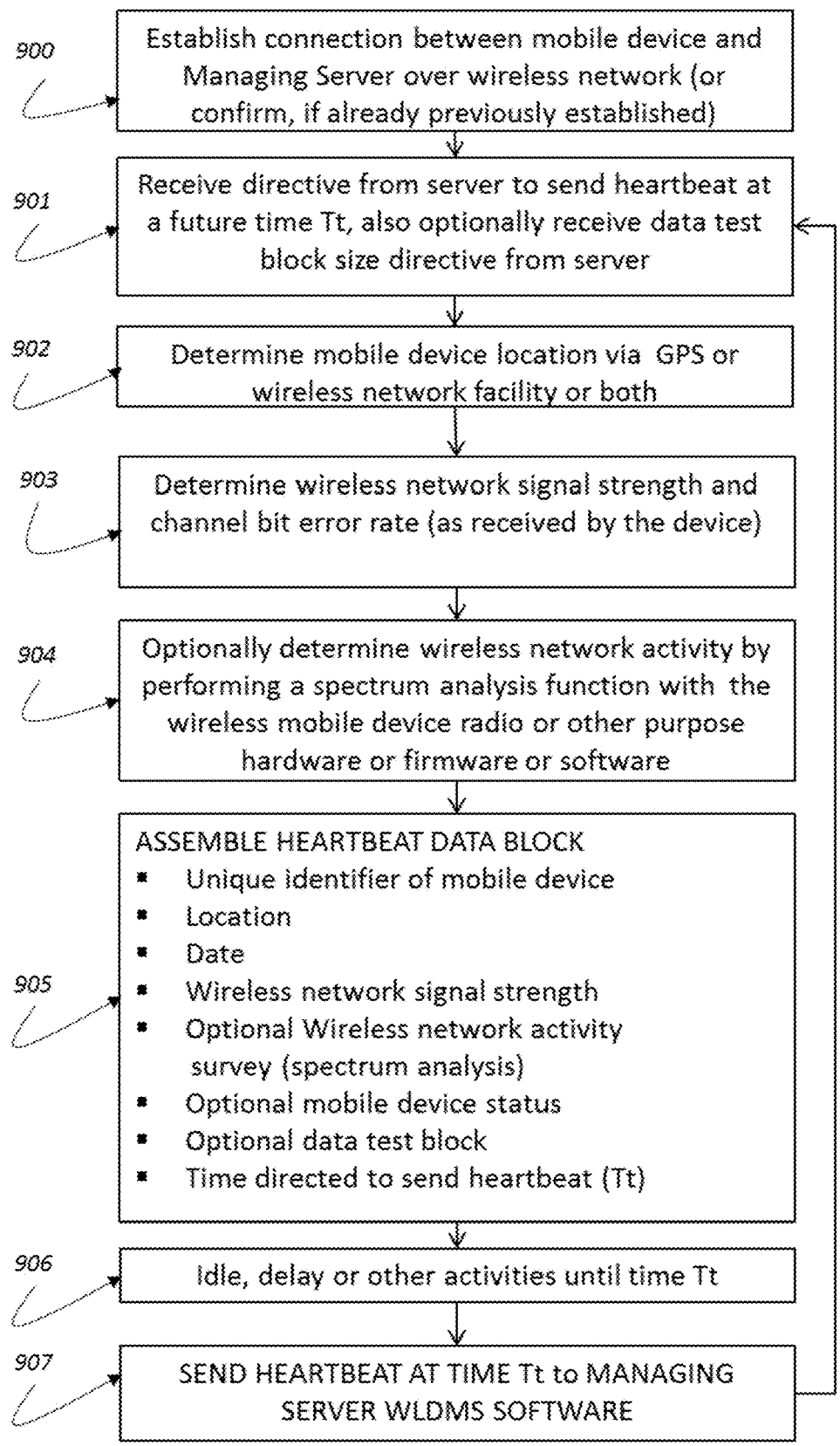
FIG. 9 is a flow diagram illustrating a preferred exemplary embodiment of operations implemented by the system, method and devices, wherein the server places a request to the mobile device to assemble the heartbeat but to refrain from transmitting it until a specific time (which is communicated to the mobile device well ahead of that specific time).
Figure 10:
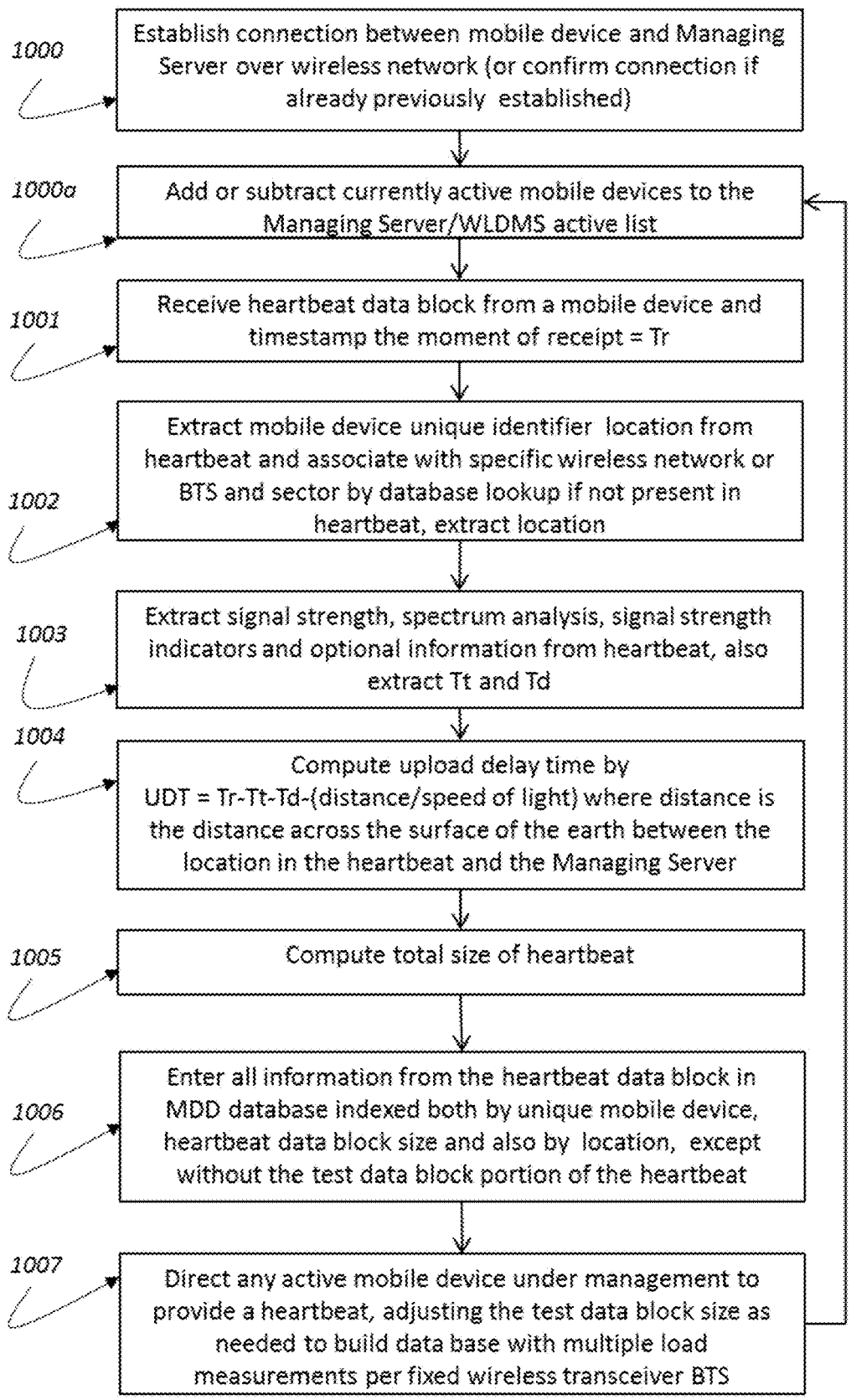
FIG. 10 is a flow diagram illustrating a preferred exemplary embodiment of the function of the management application, such as, the WLDMS in FIG. 7.

Without limiting the generality of the invention, depicted in FIGS. 8, 9 and 10, are exemplary embodiments illustrating examples of process steps for managing network communications and applications on mobile devices. The process steps may be implemented by a mobile wireless device that is configured with software containing instructions to instruct the processor to obtain information from the mobile device components and the network facility. For example, the mobile device processor may be instructed to obtain a GPS location from the mobile device GPS chip or from the network facility. The mobile device processor may be provided in the form of any suitable processor, microprocessor or microcontroller, for example. Process steps also may be implemented by a management server. According to preferred embodiments, the software may be stored on the mobile device, for example, on a storage component that is linked with or associated with the processing component. The storage component may be memory that is provided on the wireless mobile device, including, for example, as part of a microcontroller, board, circuitry or other component.

According to an exemplary embodiment, an example of process steps which are implemented in conjunction with the Wireless Load Discovery Software and Hardware (734) and the WLDMS (733) is indicated in flow diagrams set forth in FIGS. 8, 9 and 10. It should be noted that an implementation of these steps illustrated in the preferred embodiments may be reasonably adjusted by those practiced in the art without departing from the scope of the invention.

Referring to FIG. 8, the flow of operations represents an example of the process steps carried out to determine wireless network capability. FIG. 8 illustrates process steps which would be executed by the Wireless Load Discovery Software and Hardware means (FIG. 7, 734) which operates on the mobile device, typically either a SmartPhone (710) or a SmartThing (711). An algorithm may be provided to be implemented in a computer processor, such as a processing component of the device, a management server, or both. The algorithm preferably includes instructions for obtaining the information available through the wireless device and its components (e.g., sensors, location components such as GPS), and for instructing the processor to process the information. According to a preferred implementation, the process may be conducted using a wireless mobile device that is configured to communicate on a wireless network. Once a connection is established between the mobile device and the server (800), the mobile device determines its location (801). The general location can be detected via the location of the wireless network transceiver by its unique identifier, or the location can be more precisely detected with the use of the global positioning system or triangulation of cellular signals. In addition, the location could be generally available within the mobile device operating system through other services or other software supplying such location generally to mobile device applications.

Next the mobile device determines the received signal strength and the bit error rate of received transmissions from the RF transceiver associated with the wireless interface (802). This information is available generally from all modern transceivers that operate with wireless cellular and Wi-Fi networks. Additional information is available from most modern transceivers such as RSSI, RSRP, RSRQ, SNIR and other measurements useful for predicting upload throughput from a mobile device to a server via a wireless network system.

According to some embodiments, the mobile device is configured to perform an optional spectrum analysis. In this next step, the mobile device can optionally perform a specialized spectrum analysis (803), to discover the average energy in each frequency band related to the specific type of wireless connection between other mobile devices, the mobile device, and the fixed transceiver, over some period of time. This spectrum analysis function may be performed with dedicated hardware which is provided in purpose-build SmartThings, or may be provided via the use of the RF transceiver in the mobile device coupled with specific purpose software or firmware. Depending on the model and type of RF transceiver in the mobile device, this function may not be able to be quickly or reliably performed. However, if it can, it provides robust information about the loading on the cell network. For example, the spectrum analysis function may be carried out with the use of a wireless transceiver that is commercially available for communication over public cellular networks and Wi-Fi networks, and which is configured to include functions and test features provided in or in association with the wireless transceiver, its circuitry or microcontroller. According to one exemplary embodiment, the mobile device is configured with software containing instructions to obtain the information from the transceiver regarding the average energy in each frequency band related to the specific type of wireless connection (e.g., between other mobile devices, the mobile device, and the fixed transceiver, over some period of time). The information may be utilized in conjunction with the estimation of the network upload capacity and availability to the wireless mobile device, and according to some embodiments, may be provided in the heartbeat data block.

Next, the mobile device assembles the information gathered previously into a data block for transmission to the server over the wireless network (804). This data block can contain additional optional test data of a variable size which can be determined by a number of factors related to the general use model of the mobile device. However, important in the assembly of the block by the Wireless Load Discovery Software and Hardware (734) is the insertion of two parameters, one being a fixed time period specific to each mobile device representing the time delay (Td) between the time the insertion of the Time of Transmission time (Tt) and final assembly of same into the heartbeat data block is complete and the time the upload of the heartbeat block is requested by the mobile device processing unit to be sent to the server via the mobile device's RF transceiver. The delay parameter is intended to be used to disambiguate any mobile device processor delay from the calculation by the server of the delay over the wireless network to receive the heartbeat. Once the final time is assembled and all parameters are present, the heartbeat data block is uploaded (805) over the wireless network.

Another preferred embodiment of the flow of actions is indicated in FIG. 9. The blocks indicated have the same functions as FIG. 8, except that in this case, the server acting with the WLDMS (733) places a request to the Wireless Load Discovery Software and Hardware (734) on the mobile device to assemble the heartbeat but refrain from transmitting it until a specific time Tt, which the WLDMS communicates to the mobile device well ahead of time Tt (901). Furthermore, the server and WLDMS instruct the mobile device Wireless Load Discovery Software and Hardware (734) to create a data test block of a specific size, which may comprise a small number of bytes, or may comprise the equivalent of several seconds or even potentially a minute of data to be uploaded by the mobile device as a proxy for a definite application upload requirement. The mobile device and the Wireless Load Discovery Software then act to assemble the heartbeat to be sent to the Managing Server (702) for processing by the WLDMS (733), but sends it only precisely at time Tt. Because the WLDMS (733) in FIG. 7 is managing many mobile devices all producing heartbeats, by directing a specific mobile device to send its heartbeat at a specific time, the WLDMS can minimize the likelihood that two mobile devices will send heartbeats at exactly the same time to the WLDMS. Furthermore, if the WLDMS (733) directs the mobile device to send a large amount of data for testing the upload capacity of the wireless network with respect to the specific mobile device (710, 711) in a specific sector or sub-zone of a specific BTS (700), it can be prepared to time the receipt of the heartbeat.

An exemplary embodiment of process steps that may be implemented to manage mobile devices on a network is depicted in FIG. 10. Referring to FIG. 10, a preferred embodiment of the function of the WLDMS (733) in FIG. 7 is provided. In the embodiment illustrated, first, the WLDMS maintains a current list of all mobile devices of which it is aware which are active on a wireless network (1000 and 1000a). According to one embodiment, this may be done by providing instructions to a processor, such as the processing component of the management server, to generate information identifying the active devices on the network (or portion of the network serving the devices). The WLDMS processes the heartbeat data block by first time-stamping its receipt (1001), then identifies the heartbeat with a unique mobile device, a physical location and a specific wireless network, BTS, sector or sub-zone if such information is available in the heartbeat, or otherwise by lookup in a database (not shown) of fixed transceiver locations (1002). Additional information about signal strength at the mobile device and the amount of energy in the frequency bands being employed by the wireless network to communicate with the wireless device that sent the heartbeat are extracted (1003).

Then the upload time delay (UDT) is computed (1004). According to a preferred embodiment, UDT is computed by subtracting the time the heartbeat was sent as found in the heartbeat (Tt) from the time the heartbeat was received (Tr) and further subtracting the delay time (Td) found in the heartbeat and then further subtracting the time for light to cross the distance over the surface of the earth from the location found in the heartbeat to the location of the Managing Server, called TL (time-of-light-travel). The time-of-light-travel may be altered (increased) by a factor related to transport over fiber optics (approximately 1.5) or other factors to account for the routing functions unrelated to wireless upload time pertaining only to the wireless network itself, which can be ascertained according to methods practiced in the art.

According to a preferred embodiment, the UDT may be expressed by the following expression:

$$UDT = Tr - Tt - Td - (D/TL) \quad (1)$$

In expression (1), above, UDT is the upload time delay, where Tr is the time the heartbeat was received, Tt is the time the heartbeat was sent, Td is the transmission time delay (provided in the heartbeat) representing the time between (i) the time the insertion of the Time of Transmission time (Tt) and final assembly of same into the heartbeat data block is complete and (ii) the time the upload of the heartbeat block is requested by the mobile device processing unit to be sent to the server via the mobile device's RF transceiver.

A further embodiment of the expression is set forth below as expression (2):

$$UDT = Tr - Tt - Td - (D/TLf) \quad (2)$$

In expression (2), above, the TL of expression (1) is replaced with a factored time-of-light-travel, TLf. The factored time-of-light-travel, preferably represents an altered, and preferably increased factor, to take into account transport properties, such as, transport over fiber optics (approximately 1.5), or other factors that account for routing functions unrelated to wireless upload time which pertain only to the wireless network itself.

The information, preferably the UDT and the parameters used for its determination, along with the total heartbeat data block size (1005) is entered in the MDD database (704) (1006). According to preferred embodiments, the component, such as, for example, the management server, is configured to implement this process (1007) and repeat it in order to generate a performance survey. According to preferred embodiments, the WLDMS repeats this process (1007) often varying the requested heartbeat size to build a database of the upload times, loading and other properties of various wireless network coverage areas where it is managing active mobile devices. By varying the heartbeat size at different times of day, days of week, varying signal conditions and varying positions with respect to the fixed wireless transceiver antenna, the WLDMS (733) is able to build a performance survey of the ability of the wireless system (701) to service uploads from mobile devices under particular conditions. According to preferred embodiments, the WLDMS is configured with instructions to instruct the processing component of the management server, and to communicate any instructions to a mobile device being served by the wireless network, to repeat process (1007). According to preferred embodiments, the instructions may include varying the requested heartbeat size and generating a database of the upload times, loading and other properties of various wireless network coverage areas where the network is managing active mobile devices.

Figure 11:
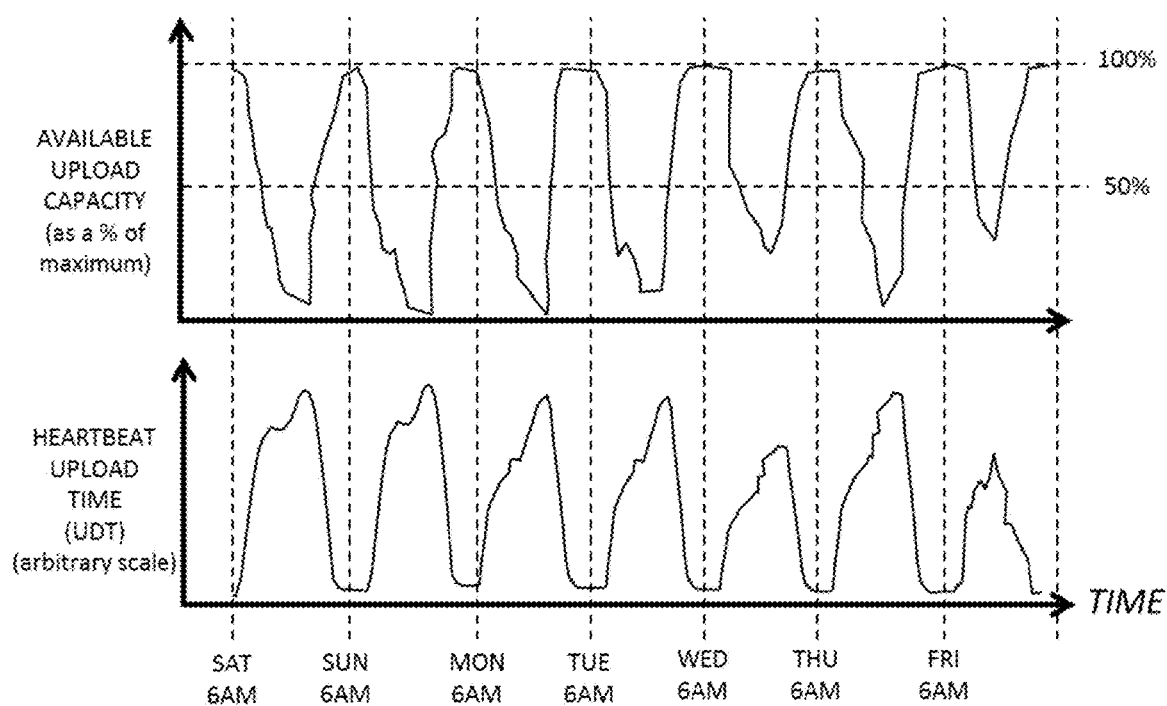
FIG. 11 is a chart representing the actual available upload capacity of a specific wireless network via a specific fixed wireless transceiver over an entire week, where the upper chart shows actual available upload capacity as a percentage of the maximum capacity, and where the lower chart depicting the upload time of the heartbeat (UDT) for the week.

Using the information stored in the MDD (704), the WLDMS (733) can build statistics for the upload capacity of a specific fixed wireless transceiver coverage area for a particular wireless service with respect to any variable, or multiple variables, such as over time and over day, with respect to any specific metric which is easily and quickly measured by the Wireless Load Discovery Software and Hardware (734) on the mobile device (710, 711) in conjunction with the WLDMS (733). Such statistics can be stored in a Wireless Network Equipment database (705) which can be quickly referenced when potentially useful, as a preferred embodiment describes below. Without limiting the scope of the invention, according to an exemplary embodiment, an example of the information that may be complied for a specific region covered by a specific fixed wireless network transceiver is indicated in FIG. 11. In FIG. 11, the upper chart is the actual available upload capacity of a specific wireless network via a specific fixed wireless transceiver over an entire week. The upper chart shows the actual available upload capacity as a percentage of the maximum capacity. For example, a sector or sub-zone of a fixed wireless transceiver and associated Wireless Network Equipment may have a maximum capacity of 27 megabits per second. As this maximum is approached, the UDT time also increases proportionately. Although the graphs indicated in FIG. 11 are smoothed and actual readings may vary substantially as mobile devices connected over the same fixed wireless transceiver engage and dis-engage in upload activities, nevertheless it is possible to approximate the true available capacity of a wireless network from a specific fixed transceiver in the network with the upload time of the heartbeat (UDT). Other factors which are measured and provided as discussed in the heartbeat above may be used to refine the estimate of the upload rate possible from any specific mobile device in a location with respect to a specific fixed wireless network transceiver at any particular time and under any particular set of conditions. For example, the heartbeat data block may include the unique identifier of the mobile device, the device location, the date and time, wireless network signal strength, wireless network activity survey, e.g., optional spectral analysis, mobile device status; data test block, and times for transmission events, such as, for example, transmission delay time (Td), and time of transmission (Tt). The heartbeat data block data components may comprise one or more of the information parameters.

The information accumulated and analyzed by implementation of the WLDMS (733) by a component, such as, for example, the management server, may take on many dimensions not easily visualized in a chart or graph. Over time, the WLDMS (733) can accumulate many readings from many mobile device Wireless Load Discovery Software and Hardware (734) modules in mobile devices so equipped and thereby build an increasingly accurate capability for estimating the useful upload rate that a specific mobile device (710, 711) with a specific application (712) which necessitates a real-time upload capability as part of its function, such as streaming video from a camera on the mobile device to application software (703) present on a server (702) on the internet or other private network connected (706, 707) to the wireless network (701, 700).

Figure 12:
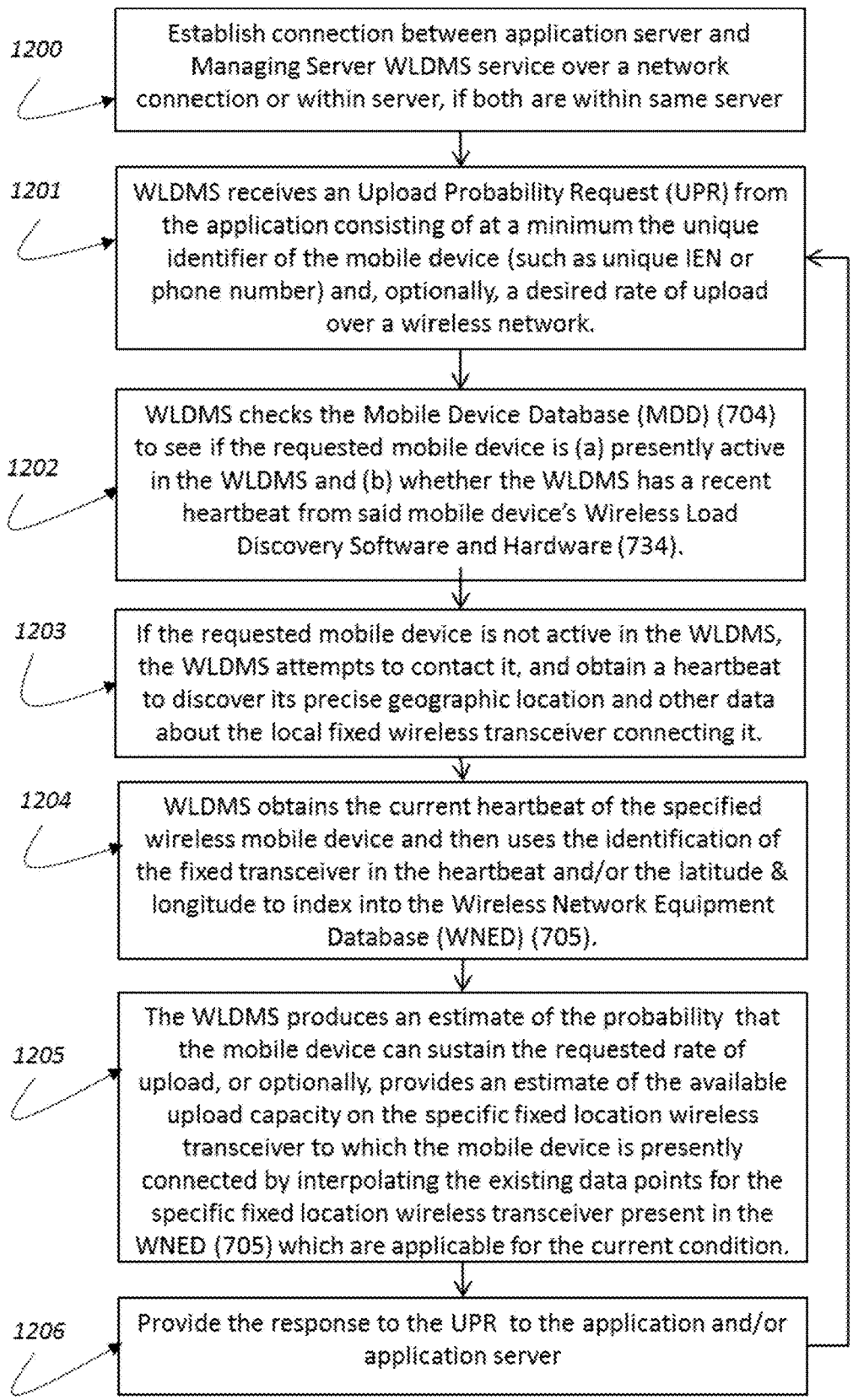
FIG. 12 is a flow diagram illustrating an exemplary embodiment of the process and system for providing upload capacity estimates to an application.

Referring now to FIG. 12, a preferred embodiment of many possible equally useful embodiments of how the WLDMS (733) provides upload capacity estimates to an application is indicated. Through an application programming interface or other typical interface between servers, including those practiced in the art, the application which (712 and 703 or 723 and its mobile device counterpart) is anticipating enabling the mobile device (710, 711, 760) to upload a large amount of data or a sustained high rate of data upload, such as video, to a server (702 or 722) makes an Upload Probability Request (UPR) to the WLDMS (733) on Managing Server (702) (steps 1200 and 1201). The WLDMS includes an instruction for implementing a check of the Mobile Device Database (MDD) (704) to undertake a comparison to determine whether the requested mobile device is presently active in the WLDMS and whether the WLDMS has a recent heartbeat from said mobile device's Wireless Load Discovery Software and Hardware (734) (1202). If the requested mobile device is not active in the WLDMS, the WLDMS attempts to contact it via the wireless network (701, 700), and obtain a heartbeat to discover its precise geographic location and other data about the local fixed wireless transceiver connecting it by connecting with the mobile device's Wireless Load Discovery Software and Hardware (734) and obtaining a heartbeat such as through the process in FIG. 8 or 9 and thence processing the heartbeat such as through the process in FIG. 10 (1203).

Once the WLDMS establishes the geographic location of the mobile device and the local fixed wireless transceiver serving it at the present moment, the WLDMS can then access the historic details and understanding of the fixed transceiver's probable available upload capacity based on historic stored information in the WNED (705) (1204). The WLDMS then produces an estimate of the probability that the subject mobile device can sustain a requested rate of upload, or optionally, the WLDMS provides an estimate of the available free usable upload capacity on the specific fixed location wireless transceiver to which the subject mobile device is presently connected. It creates the estimate by interpolating the existing data points for the specific fixed location wireless transceiver present in the WNED (705) which are applicable for the current condition, based on the last heartbeat received from the subject mobile device. Many methods exist for computing an estimate for a variable in a data set given a set of inputs which previously have not been encountered or stored in the data set, which are well known to those practicing the art.

The response to the UPR, either in the form of a probability estimate for the success for the requested upload rate, or in the form of the estimate of the sustainable upload rate possible in response to the request, is then provided to the application and/or application server which can then use the information to adjust the parameters of, for example, the upload rate for a video stream or other related type of real-time critical upload between a mobile device and a server.

In the previously discussed FIGS. 8, 9 and 10, the Tt and Tr times specified are absolute times, based on a reference time available at once to both the mobile devices and the Managing Server (702) and WLDMS (733). This time reference would generally be either wireless network time, or time derived from global positioning system or some other global reference generally available, which is uniform across the geographic region covering the mobile device's location as well as the Managing Server's location. In addition, although the Managing Server is show to host both the WLDMS (733) software as well as an application (703), the servers may be separate, for example, as indicated by server (722) running other application software (723).

In addition, applications which are provided by private contract between parties (an application provider and an application user) can include incentives in the business model or contract for both humans and autonomous or semi-autonomous activities to modify their behavior based on cost or priority as a wireless network connection is becomes more heavily loaded or overloaded. Because these contracts are private, they may not be subject to common carrier laws like "net neutrality" in the US.

For example, a company may purchase a large number of minutes of wireless from a major wireless service provider, and then re-sell those minutes to mobile device subscribers (and users of applications which employ the wireless network), subject to said mobile devices employing the Wireless Load Discovery Software and Hardware (734) so that said company can expect that mobile devices employing the minutes (e.g. 760) will both report to, as well as be coordinated by, the WLDMS (733). Such a business model could be encouraged by major wireless service providers who could discount the minutes sold to said company even more than otherwise, in view of the fact that such minutes would typically present less average load to the wireless network than otherwise, since the load on the major wireless service provider's networks would have a less deleterious effect than other non-WLDMS coordinated devices.

Operation of the System

The above operations of the method, device and system, may be implemented in connection with a number of applications. An exemplary embodiment of an implementation of devices, systems and methods for managing mobile wireless devices and networks is discussed.

Figure 1:
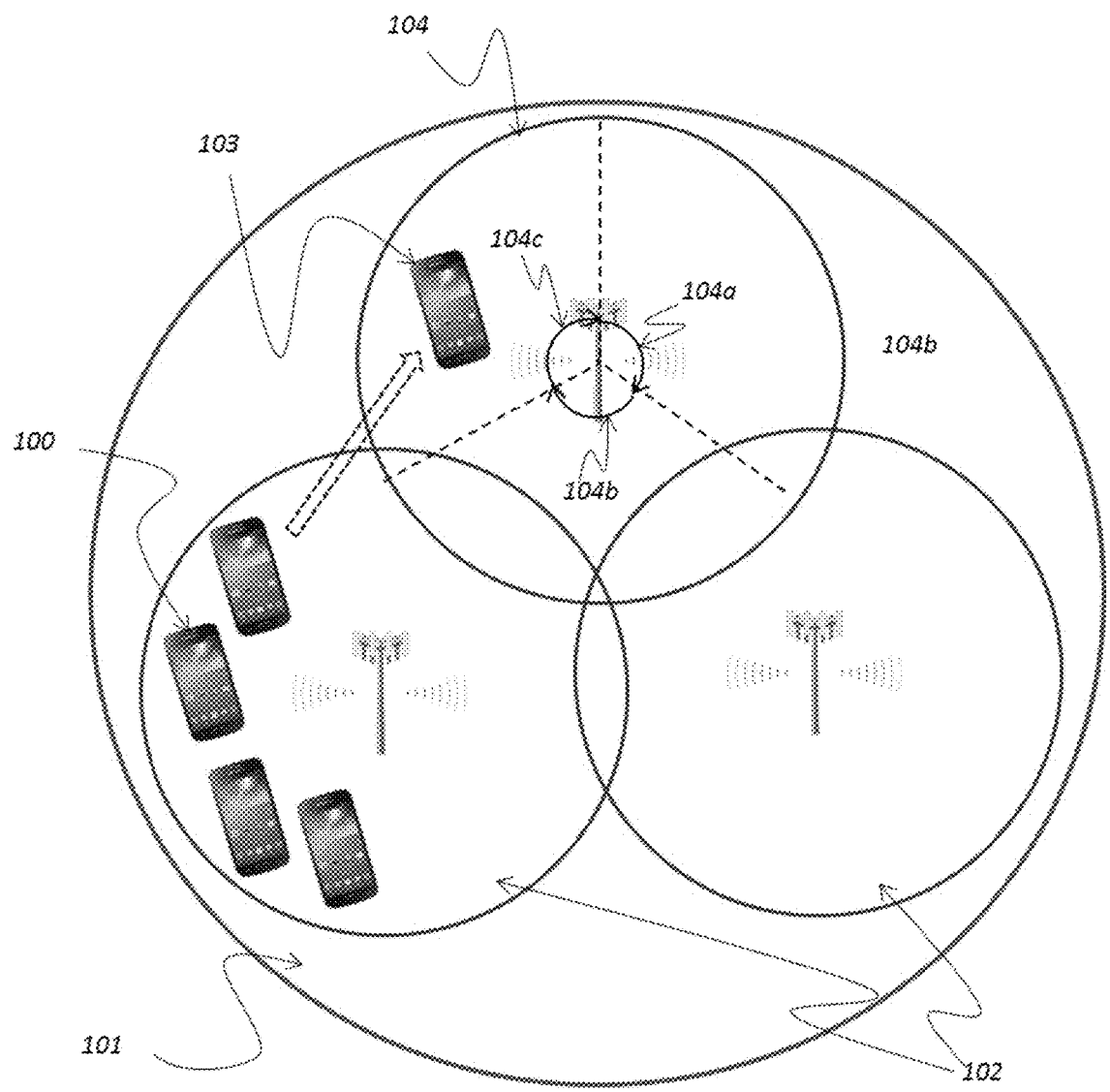
FIG. 1 is a schematic illustration of an exemplary prior art network on which a plurality of wireless mobile devices communicate, and are served by radio transceivers within a sub region of a larger region.
Figure 2:
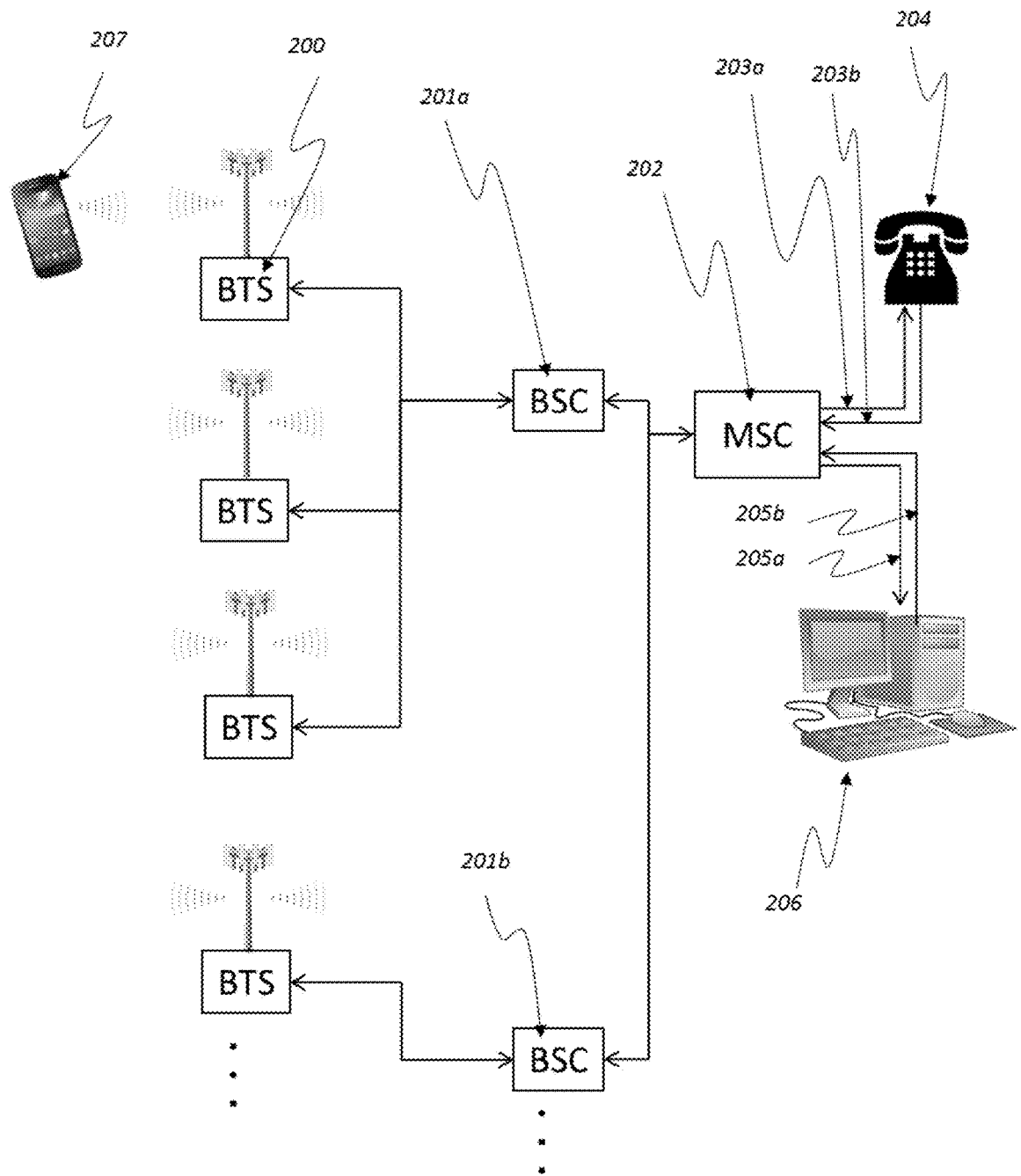
FIG. 2 is a schematic illustration of an exemplary prior art arrangement showing multiple Base Transceiver Stations interfacing with a mobile device over radio waves, connected to a Base Station Controller, which are in turn aggregated under a Mobile Switching Center.
Figure 3:
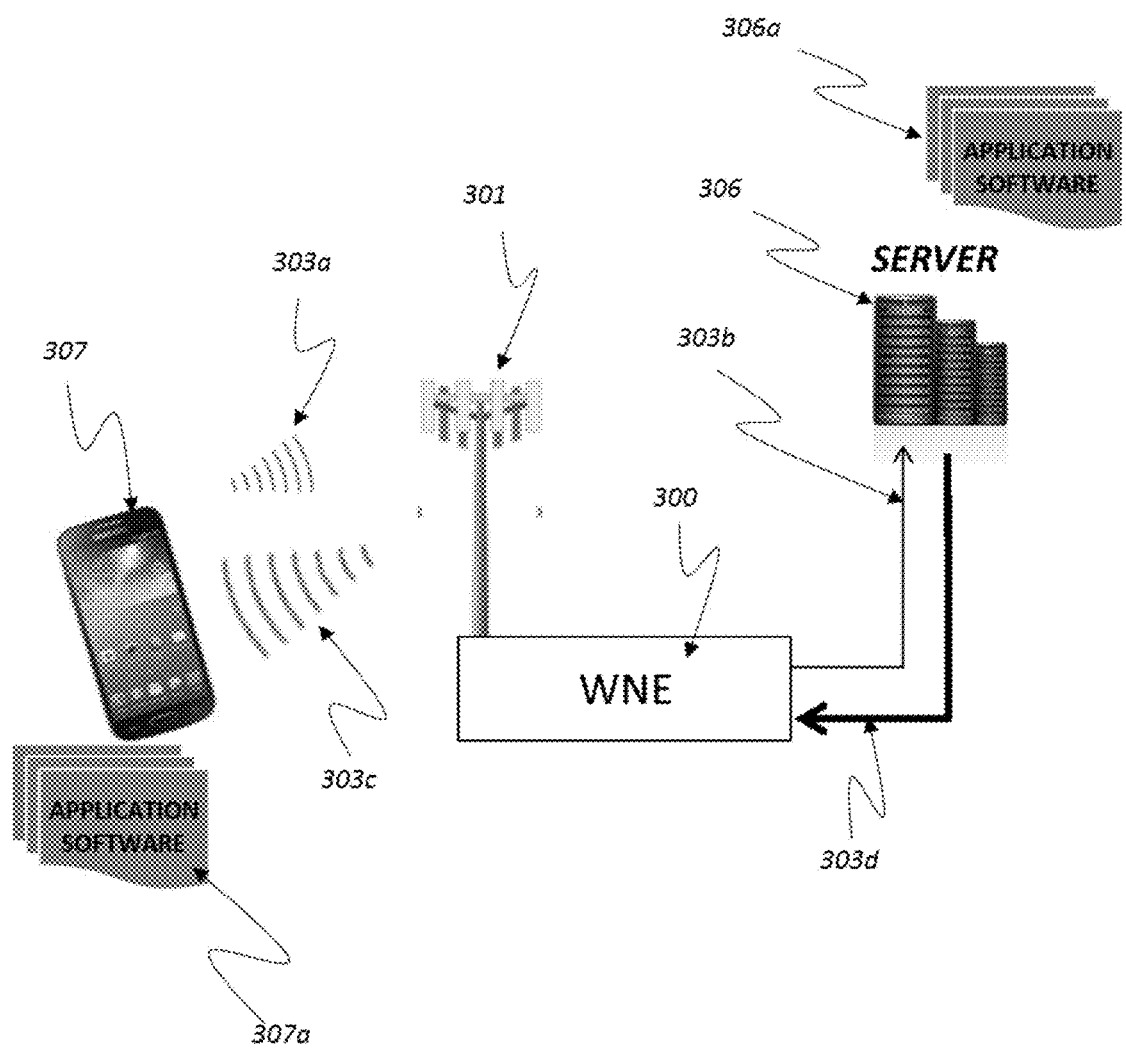
FIG. 3 is a schematic illustration of an exemplary prior art arrangement where the elements of FIG. 2 are represented within the Wireless Network Equipment, and showing a mobile device in an arrangement to communicate with a server.
Figure 4:
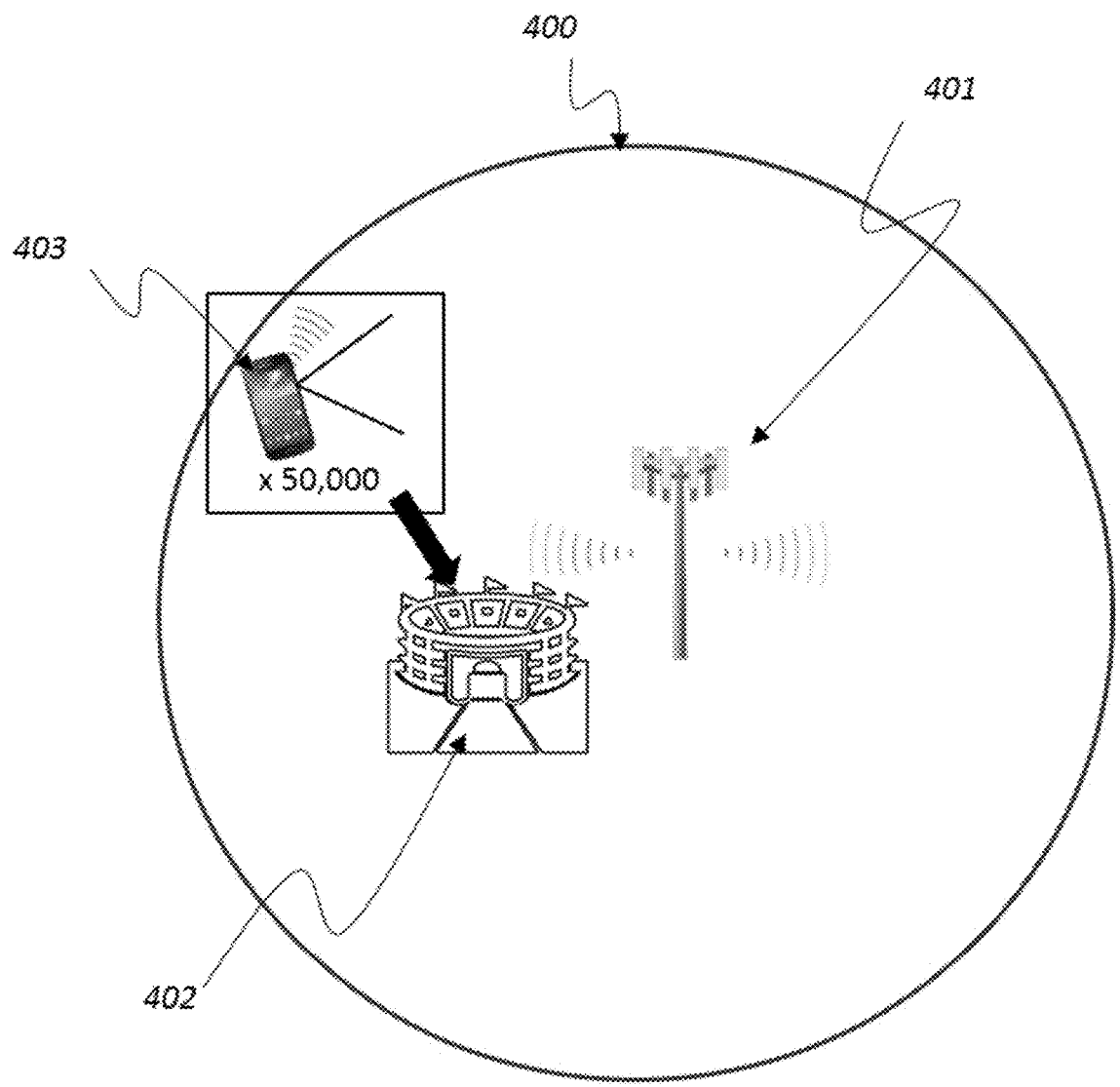
FIG. 4 is a schematic illustration of a stadium representing 50,000 patrons that each have their own individual SmartPhone.
Figure 5:
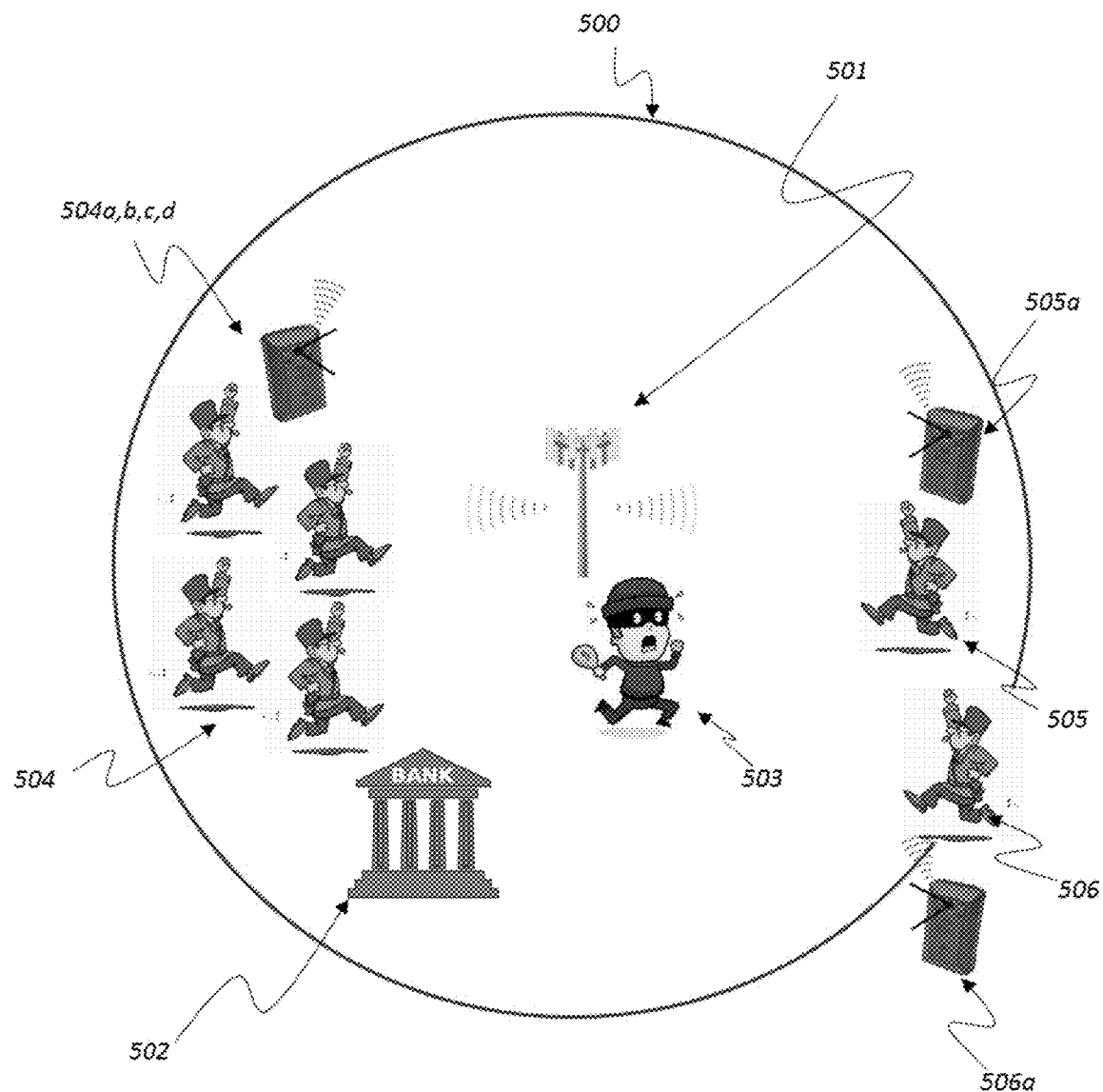
FIG. 5 is a schematic illustration showing a bank, a bank robber, and a number of gendarmes with wireless body worn video cameras who are in pursuit of the robber.
Figure 6:
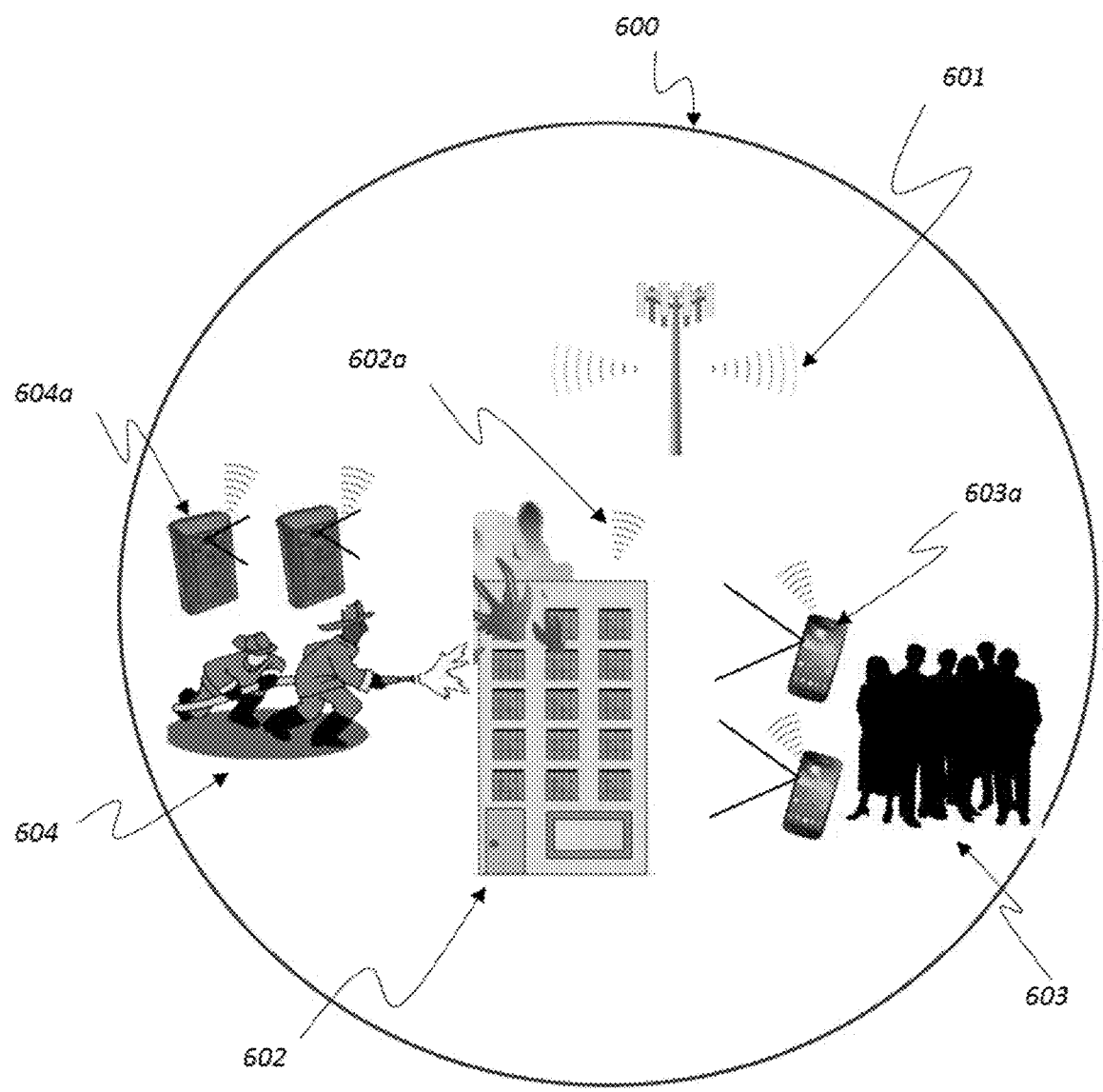
FIG. 6 is a schematic illustration of a building on fire, an wireless devices in the building, and wireless devices associated with firefighters and spectators.
Figure 13:
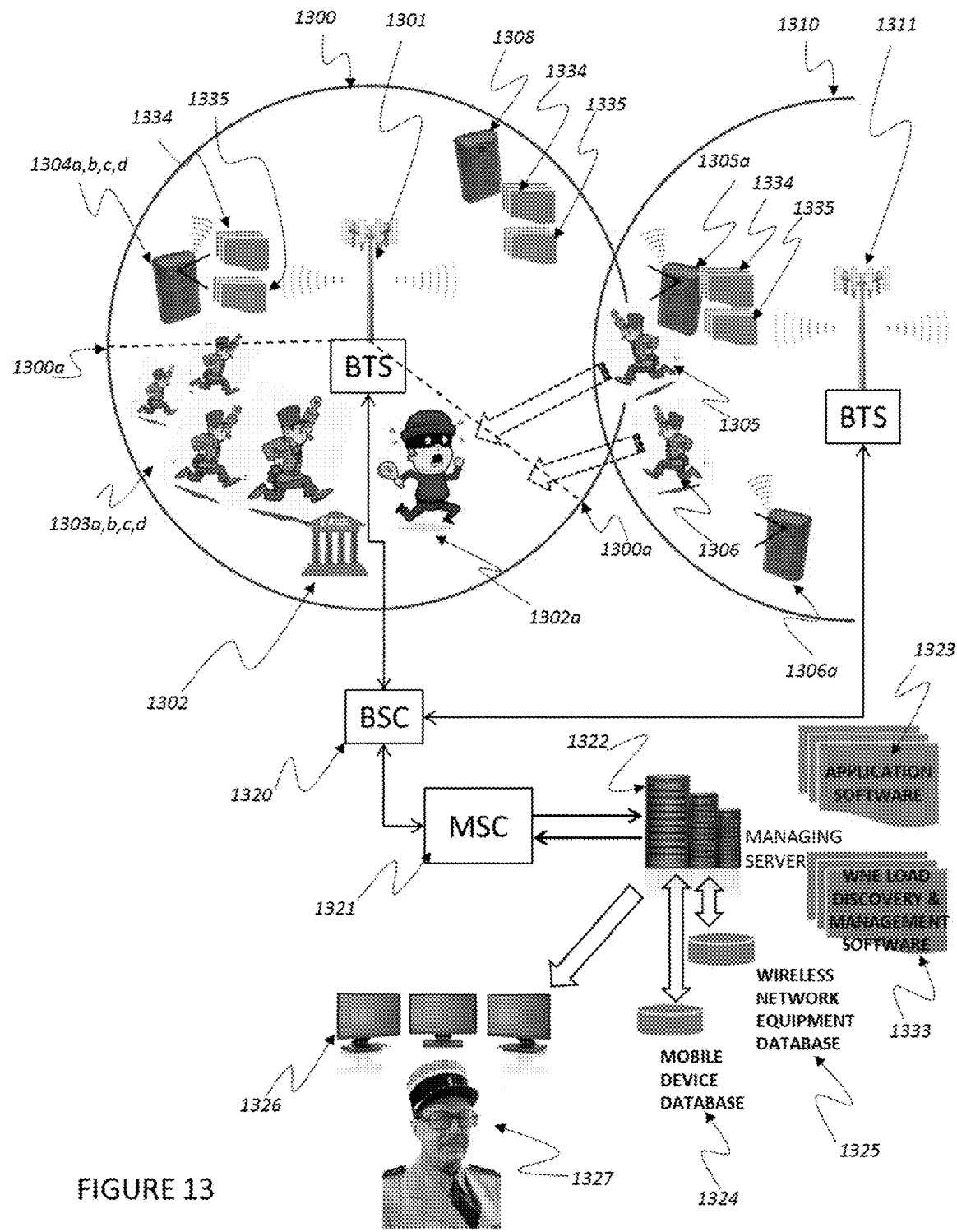
FIG. 13 is a schematic illustration showing a bank, a bank robber, and a number of gendarmes with wireless body worn video cameras who are in pursuit of the robber, and further showing the implementation of the system for estimating wireless network load and managing wireless mobile devices in the utilization of the network.

The above problem situation associated with FIG. 5, and discussed above, can now be revisited with further detail showing the inclusion of the disclosed system operation, according to a preferred embodiment. FIG. 13 illustrates an exemplary embodiment showing further detail of the system components utilized in conjunction with the method.

In the exemplary embodiment depicted in FIG. 13, the arrangement is presented where an application (1323) on a server (1322) manages several mobile devices which are of the SmartThing-type, comprised of the police body cameras on the gendarmes (1304*a, b, c, d,* 1305*a,* 1306*a*) in a region. For simplification and without limiting the scope of the invention, the region (1300, 1310) in FIG. 13 consists of that area covered by two BTSs (1301, 1311) which are connected to a BSC (1320) and then an MSC (1321) to complete a typical wireless network architecture. As is typical of mobile devices, each mobile SmartThing device (police body cameras 1304*a, b, c, d,* 1305*a,* 1306*a*) would transmit a heartbeat from itself to the server (1322) over the wireless network every, say, thirty seconds. The heartbeat would typically include the exact GPS coordinate position of each mobile device police body camera and exact time when the heartbeat was sent, the specific BTS transceiver employed, along with signal strength and estimate of the total power of all transmissions which each mobile device can sense in its local area via its radio, in the frequency bands related to transmission of wireless information over the network via the specific BTS (1300) and sector within a BTS (1300*a*).

As each gendarme makes his rounds, the mobile devices move around the region (1300, 1310) collect information and construct and report heartbeats autonomously, which are processed by the application software (1323) on Managing Server (1322). The exact time of receipt of the heartbeats by the Managing Server and comparison with the time the heartbeat was sent, along with additional information about the RF link between the mobile devices and the fixed transceivers provided by the mobile devices are stored in the Mobile Device Database, MDD, (1324), and as well accumulated in the WNED (1325). In addition, the WLDMS (1333) and Managing Server (1322) may initiate a download to a specific mobile device of a test data string which is immediately turned around by the device and uploaded with a known fixed delay, providing additional information to the Managing Server (1322) and WLDMS (1333) as to the loading of the BTS (for example, 1300) in any specific sector (for example, 1300*a*) with respect to the uploading of data by the mobile device police body cameras. Alternatively, a test string could be pre-programmed into each of the mobile device police body cameras, which is triggered to be sent by the Wireless Load Discovery Software and Hardware (1334) at a specific time by a request from the WLDMS (1333) on the Managing Server (1322).

The WLDMS continuously develops an estimate of the present loading of each BTS (901, 911) covering areas where it is managing mobile devices, derived from the heartbeat information provided by the mobile devices, and also uses the heartbeat data to update and refine the information in the WNED (925), which provides an estimate of the maximum sustainable upload rate through each BTS-BSC-MSC combination, including the sector of a particular BTS (i.e. 1300*a*). That comparison thus continuously also computes an estimate of the available upload capacity remaining for each BTS (901, 910) where gendarmes with mobile device police body cameras are deployed, and, optionally, each mobile device (1304*a, b, c, d,* 1308, 1305*a*, 1306*a*) which it is managing. Thus at any moment if a mobile device is required by the circumstance to upload video at a significant streaming rate to the video management application software (1323) for viewing on the monitors (1326) by commander (1327), the application can be prepared to manage the video rates to avoid overload of the wireless network, and potential loss of quality video from any mobile police body camera.

Assume now that the robber (1303) has robbed bank (1302), an alarm (not shown) has been sounded, and is the robber is making a getaway. As he is pursued by a first gendarme in the immediate vicinity (1303*a*), the gendarme's mobile device police body camera (1304*a*) automatically turns on and requests through the application software (1335 and 1323) that it be permitted to upload streaming real-time video over the wireless network back to the server (1322) for visualization by the commander (1327) on video screens (1326) associated with the server and applications software for the mobile device police body camera application. The application software (1323) makes a UPR pertaining to the specific said mobile device (1304*a*), and the WLDMS (1333) returns a probability that the mobile device can successfully upload at the desired rate, based on the heartbeat and the estimated current state of the wireless network.

The MDD (1324) can also now be updated to indicate an additional upload load in the region covered by BTS 1301, sector 1300*a*. Next, either autonomously or by command, assume additional mobile device police body cameras come on and begin requesting to upload streaming live video feeds from other gendarmes who take up the pursuit (1303*b, c, d*) such that the load on BTS 1301 would become at its hypothetical upload limit, considering the gendarme's upload video load as well as other unrelated wireless upload activities (not shown) within the region covered by BTS 1301.

The state of BTS 1301's remaining unused upload capacity is known to the applications software both from computing its own estimate of the additional load the excitement has created through the turn on of multiple upload streams from the multiple mobile device police body cameras, as well as by estimates of the load on BTS 1301 generated by other mobile devices (1308) within the area (1300, 1300*a*) of the BTS (1301) which are still sending only heartbeats.

As yet more gendarmes (1305, 1306) are called to the pursuit from other areas (1310), the application software recognizes their location by the heartbeat from their mobile device police body cameras (1306*a*, 1305*a*) as being close to the existing highly loaded BTS 1301, but yet still within the region of BTS 1311 and therefor does not disable or modify their video upload streams which are arriving at server 1322 via BTS 1311. However, as the gendarmes 1305 and 1306 cross into the region (1300) covered by BTS 1301, the system recognizes the potential for overload of the upload link beginning with BTS 1301 from all the mobile device police body cameras which are now within the region (1300) served by BTS 1301.

Without any action by any person, the application (1323) serving the video streams to the commander (1327) can make multiple UPR requests to the WLDMS (1333) of the available wireless network capacity, and also can calculate by its own reading of heartbeat location data an increased concentration of mobile devices streaming video from one area. According to an exemplary embodiment, the management server 1322 is configured with software, preferably an application software that includes instructions to implement steps to regulate the video properties, such as the video quality, to an appropriate condition, based on the network capacity (including the capacity available, or to enhance the available capacity, e.g., reducing demands of an application). According to preferred embodiments, the conditions may include one or more of situations, local laws, safety of the public and the gendarmes, or any other consideration. The system may be configured to selectively command the multiple mobile device police body cameras to reduce video frame rate or even cease upload streaming in response to a network upload capacity condition, or a potential condition that is anticipated. The software may be provided configured as an upload back-off algorithm appropriate to video quality required by the situation, local laws, safety of the public and the gendarmes, or any other consideration, by selectively commanding the multiple mobile device police body cameras to reduce video frame rate or even cease upload streaming. For example, the system could command two of the four mobile device police body cameras on gendarmes advancing from the west to cease streaming while letting the mobile device policy body cameras on the gendarmes advancing from the east to remain on, keeping the total upload video stream load within the capacity of the BTS (1301). This is a far preferable result than losing all of the video streams altogether due to overloading the upload side of the wireless network linkage that starts with BTS 1301.

These and other advantages may be realized with the present invention. For example, although the upload capacity is shown and discussed, embodiments may be configured for use in connection with download capacity, or both upload capacity and download capacity. While the invention has been described with reference to specific embodiments, the description is illustrative and is not to be construed as limiting the scope of the invention. Various modifications and changes may occur to those skilled in the art without departing from the spirit and scope of the invention described herein and as defined by the appended claims.

What is claimed is:

1. A system for managing a load of a wireless network to minimize a probability of the wireless network becoming overloaded, and to maximize the probability of successful operation of the wireless network for transporting data associated with applications requiring significant resources from the wireless network, comprising:
   a) a first component comprising a wireless mobile device configured for communications with the wireless network, said wireless mobile device being served by at least a portion of said wireless network;
   b) a first application formed in hardware, software, firmware, or some combination thereof provided on said wireless mobile device,
   c) second component comprising a management server configured for communications with said wireless mobile device;
   d) said management server including a second application formed in hardware, software, firmware, or some combination thereof provided in conjunction with said management server;
   e) said management server second application being configured with instructions for implementing the steps, continuously, intermittently or when demanded, of:
   (i) making a measurement of signal strength of the signal received by the wireless mobile device, or (ii) making a measurement of signal power in specific frequency bands being employed by the wireless mobile device in its communications mode over the wireless network, or (iii) making both (i) and (ii), and (iv) making a measurement of time of day, and (v) making a measurement of a location of said wireless mobile device either by using a global positioning system to determine latitude and longitude or by ascertaining unique identifier of a fixed antenna and sub-zone or sector of that antenna and/or transceiver providing wireless service to the mobile device, or by both, and (v) optionally creating a test block of data;
   f) wherein the second application formed in hardware, software, firmware, or some combination thereof on the management server includes instructions for generating an estimate of a remaining unused or available upload capacity of that portion of the wireless network serving said wireless mobile device and other wireless mobile devices being served by said portion of said wireless network, said upload capacity being the direction where data travels from the wireless mobile device, over the wireless network and to the server, for purpose of providing other applications an estimate of available or unused upload capacity of the wireless network portion serving a particular mobile device; and
   g) wherein said wireless mobile device transmits data comprising a heartbeat at a predetermined time, with said predetermined time determined by the wireless mobile device.

2. The system of claim 1,
   wherein said wireless mobile device comprises a processing unit and a transceiver;
   wherein said heartbeat comprises a data block, and
   wherein said first application formed in hardware, software, firmware, or some combination thereof provided on said wireless mobile device is configured to implement the steps of:
   assembling said heartbeat by inserting at least two data parameters, wherein at least one said data parameter is a fixed time period specific to said wireless mobile device representing a time delay (Td) between the time the insertion of the Time of Transmission time (Tt) and final assembly of same into the heartbeat data block is complete, and wherein at least one other said data parameter is the time the upload of the heartbeat data block is requested by the wireless mobile device processing unit to be sent to said management server via the wireless mobile device transceiver.

3. The system of claim 2, wherein said wireless mobile device transceiver comprises an RF transceiver.

4. The system of claim 1, wherein said wireless mobile device transmits said heartbeat only at a time when said second application on said management server implements a request and communicates the request to said wireless mobile device.

5. The system of claim 4, wherein said time at which said wireless mobile device is instructed by said management server to transmit a heartbeat is a delayed time specified in the future, and wherein said wireless mobile device first application is configured to refrain from transmitting said heartbeat until said specified time.

6. The system of claim 5, wherein said wireless mobile device receives an instruction from said management server to transmit a heartbeat well ahead of the specified time.

7. The system of claim 1, wherein said second application comprises Wireless Load and Discovery Management Software (WLDMS), said WLDMS being operative on said server, wherein said server processor is instructed by said WLDMS to process data to create a database, said database comprising an estimated wireless network upload capacity available to one or more wireless mobile devices operating on the network.

8. The system of claim 7, wherein said server configured with said WLDMS, and implements management of the available upload capacity of a plurality of wireless mobile devices over a plurality of respective wireless network connections made by said respective plurality of wireless mobile devices.

9. The system of claim 8, wherein said wireless network comprises at least one subzone, and wherein at least a plurality of said wireless mobile devices make connections within said at least one sub-zone.

10. The system of claim 9, wherein said wireless network comprises at least a plurality of subzones, and wherein at least a first plurality of said wireless mobile devices make connections within said at least one subzone, and wherein at least a second plurality of said wireless mobile devices make connections within said at least one other subzone.

11. The system of claim 1, wherein said wireless network and said portions of said wireless network have a reference upload capacity that includes a reference maximum upload capacity, wherein the reference maximum upload capacity for any particular portion of a wireless network is maintained in a separate data base.

12. The system of claim 1, generating an estimate of the reference maximum upload capacity for one or more portions of said wireless network, and maintaining said estimate in a database.

13. The system of claim 12, wherein said estimate of the reference maximum upload capacity for one or more portions of said wireless network are maintained in a separate database.

14. The system of claim 1, wherein at least one said wireless mobile device is configured to run a device application, wherein said second application is configured with instructions to implement making said estimate available to said device application that requires utilization of said network for communication of data, and wherein said device application is configured with instructions to implement modifying the planned volume or rate usage of the wireless network's upload capacity for said device application communications in view of any limitations or load effects which immediately exist with respect to communications between said at least one wireless mobile device at a particular place and time.

15. The system of claim 1, wherein said estimate is provided to said wireless mobile device, and wherein said device is configured to communicate over said network by modifying its planned volume or rate usage of the wireless network's upload capacity based on the upload capacity estimate of the portion of said network serving said device at the time at which the device communications are to be made.

16. The system of claim 15, wherein said upload capacity estimate of the portion of said network serving said device at the time at which the device communications are to be made corresponds with load effects and limitations on the network.

17. A system for managing a load of a wireless network to minimize a probability of the wireless network becoming overloaded, and to maximize the probability of successful operation of the wireless network for transporting data associated with applications requiring significant resources from the wireless network, comprising:
  a) a first component comprising a wireless mobile device configured for communications with the wireless network, said wireless mobile device being served by at least a portion of said wireless network;
  b) a first application formed in hardware, software, firmware, or some combination thereof provided on said wireless mobile device, c) second component comprising a management server configured for communications with said wireless mobile device;
  d) said management server including a second application formed in hardware, software, firmware, or some combination thereof provided in conjunction with said management server;
  e) said management server second application being configured with instructions for implementing the steps, continuously, intermittently or when demanded, of:
  (i) making a measurement of signal strength of the signal received by the wireless mobile device, or (ii) making a measurement of signal power in specific frequency bands being employed by the wireless mobile device in its communications mode over the wireless network, or (iii) making both (i) and (ii), and (iv) making a measurement of time of day, and (v) making a measurement of a location of said wireless mobile device either by using a global positioning system to determine latitude and longitude or by ascertaining a unique identifier of a fixed antenna and sub-zone or sector of that antenna and/or transceiver providing wireless service to the mobile device, or by both, and (v) optionally creating a test block of data;
  f) wherein the second application formed in hardware, software, firmware, or some combination thereof on the management server includes instructions for generating an estimate of a remaining unused or available download capacity of that portion of the wireless network serving said wireless mobile device and other wireless mobile devices being served by said portion of said wireless network, said download capacity being a direction where data travels from the wireless mobile device, over the wireless network and to the server, for a purpose of providing other applications an estimate of available or unused download capacity of the wireless network portion serving a particular mobile device; and
  g) wherein said wireless mobile device transmits data comprising a heartbeat at a predetermined time, with said predetermined time determined by the wireless mobile device.

18. The system of claim 17,
  wherein said wireless mobile device comprises a processing unit and a transceiver;
  wherein said heartbeat comprises a data block, and
  wherein said first application formed in hardware, software, firmware, or some combination thereof provided on said wireless mobile device is configured to implement the steps of:
  assembling said heartbeat by inserting at least two data parameters, wherein at least one said data parameter is a fixed time period specific to said wireless mobile device representing a time delay (Td) between the time the insertion of the Time of Transmission time (Tt) and final assembly of same into the heartbeat data block is complete, and wherein at least one other said data parameter is the time the download of the heartbeat data block is requested by the wireless mobile device processing unit to be sent to said management server via the wireless mobile device transceiver.

19. The system of claim 18, wherein said wireless mobile device transceiver comprises an RF transceiver.

20. The system of claim 17, wherein said wireless mobile device transmits said heartbeat only at a time when said second application on said management server implements a request and communicates the request to said wireless mobile device.

21. The system of claim 20, wherein said time at which said wireless mobile device is instructed by said management server to transmit a heartbeat is a delayed time specified in the future, and wherein said wireless mobile device first application is configured to refrain from transmitting said heartbeat until said specified time.

22. The system of claim 21, wherein said wireless mobile device receives an instruction from said management server to transmit a heartbeat well ahead of the specified time.

23. The system of claim 17, wherein said second application comprises Wireless Load and Discovery Management Software (WLDMS), said WLDMS being operative on said server, wherein said server processor is instructed by said WLDMS to process data to create a database, said database comprising an estimated wireless network download capacity available to one or more wireless mobile devices operating on the network.

24. The system of claim 23, wherein said server configured with said WLDMS, and implements management of the available download capacity of a plurality of wireless mobile devices over a plurality of respective wireless network connections made by said respective plurality of wireless mobile devices.

25. The system of claim 24, wherein said wireless network comprises at least one subzone, and wherein at least a plurality of said wireless mobile devices make connections within said at least one sub-zone.

26. The system of claim 25, wherein said wireless network comprises at least a plurality of subzones, and wherein at least a first plurality of said wireless mobile devices make connections within said at least one subzone, and wherein at least a second plurality of said wireless mobile devices make connections within said at least one other subzone.

27. The system of claim 17, wherein said wireless network and said portions of said wireless network have a reference that includes a reference maximum download capacity, and wherein the reference maximum download capacity for any particular portion of a wireless network is maintained in a separate data base.

28. The system of claim 17, generating an estimate of the reference maximum download capacity for one or more portions of said wireless network, and maintaining said estimate in a database.

29. The system of claim 28, wherein said estimate of the reference maximum download capacity for one or more portions of said wireless network are maintained in a separate database.

30. The system of claim 17, wherein at least one said wireless mobile device is configured to run a device application, wherein said second application is configured with instructions to implement making said estimate available to said device application that requires utilization of said network for communication of data, and wherein said device application is configured with instructions to implement modifying the planned volume or rate usage of the wireless network's download capacity for said device application communications in view of any limitations or load effects which immediately exist with respect to communications between said at least one wireless mobile device at a particular place and time.

31. The system of claim 17, wherein said estimate is provided to said wireless mobile device, and wherein said device is configured to communicate over said network by modifying its planned volume or rate usage of the wireless network's download capacity based on the download capacity estimate of the portion of said network serving said device at the time at which the device communications are to be made.

32. The system of claim 31, wherein said download capacity estimate of the portion of said network serving said device at the time at which the device communications are to be made corresponds with load effects and limitations on the network.

33. The system of claim 1, further comprising generating an estimate of the reference maximum download capacity for one or more portions of said wireless network, and maintaining said estimate in a database;
wherein at least one said wireless mobile device is configured to run a device application, wherein said second application is configured with instructions to implement making said estimate available to said device application that requires utilization of said network for communication of data, and wherein said device application is configured with instructions to implement modifying the planned volume or rate usage of the wireless network's download capacity for said device application communications in view of any limitations or load effects which immediately exist with respect to communications between said at least one wireless mobile device at a particular place and time.

34. A system for managing a load of a wireless network to minimize a probability of the wireless network becoming overloaded, and to maximize the probability of successful operation of the wireless network for transporting data associated with applications requiring significant resources from the wireless network, comprising:
  a) a wireless network comprising components for transmitting communications between wireless mobile devices;
  b) a plurality of wireless mobile devices configured to communicate using said wireless network;
  c) wherein said wireless mobile devices are served by at least a portion of said wireless network;
  d) a first application formed in hardware, software, firmware, or some combination thereof provided on said wireless mobile devices,
  e) a second component comprising a management server configured for communications with said wireless mobile device;
  f) said management server including a second application formed in hardware, software, firmware, or some combination thereof provided in conjunction with said management server;
  g) said management server second application being configured with instructions for implementing the steps, continuously, intermittently or when demanded, of:
  (i) making a measurement of signal strength of a signal received by the wireless mobile device, or (ii) making a measurement of signal power in specific frequency bands being employed by the wireless mobile device in its communications mode over the wireless network, or (iii) making both (i) and (ii), and (iv) making a measurement of time of day, and (v) making a measurement of a location of said wireless mobile device either by using a global positioning system to determine latitude and longitude or by ascertaining a unique identifier of a fixed antenna and sub-zone or sector of that antenna and/or transceiver providing wireless service to the wireless mobile device, or by both, and (v) optionally creating a test block of data;
  h) wherein the second application formed in hardware, software, firmware, or some combination thereof on the management server includes instructions for generating an estimate of a remaining unused or available upload capacity of that portion of the wireless network serving said plurality of wireless mobile devices and other wireless mobile devices being served by said portion of said wireless network, said upload capacity being a direction where data travels from the wireless mobile device, over the wireless network and to the server, for the purpose of providing other applications an estimate of the available or unused upload capacity of the wireless network portion serving a particular wireless mobile device; and
  i) wherein said system regulates usage of said wireless network upload capacity by regulating said plurality of wireless mobile devices network usage by modifying the planned volume or rate usage of the wireless network's upload capacity for a said wireless mobile device based on the upload capacity estimate of the portion of said network serving said wireless mobile device at the time at which the device communications are to be made.

35. The system of claim 34, wherein said plurality of wireless mobile devices configured to communicate using said wireless network comprises a first plurality of wireless mobile devices, and wherein said system comprises a second plurality of wireless mobile devices, said second plurality of wireless mobile devices comprising said other wireless mobile devices, and wherein at least some of said second plurality of wireless mobile devices comprises at least some wireless mobile devices that are not regulated as to their usage of said wireless network upload capacity.

36. The system of claim 34, wherein said plurality of wireless mobile devices configured to communicate using said wireless network comprises a first plurality of wireless mobile devices, and wherein said system comprises a second plurality of wireless mobile devices, said second plurality of wireless mobile devices comprising said other wireless mobile devices, and wherein the upload capacity of at least some of said second plurality of wireless mobile devices is regulated by modifying the planned volume or rate usage of the wireless network's upload capacity for those said second plurality of wireless mobile devices, and wherein said regulating is based on the upload capacity estimate of the portion of said network serving a said regulated one of said second plurality of wireless mobile devices at the time at which the said regulated one of said second plurality of wireless mobile devices communications are to be made; and wherein said second plurality of wireless mobile devices usage of said wireless network upload capacity is regulated differently than the usage of said wireless network upload capacity by said first plurality of wireless mobile devices.

37. The system of claim 35, wherein said second application formed in hardware, software, firmware, or some combination thereof on the management server includes instructions for generating an estimate of the remaining unused or available upload capacity of that portion of the wireless network serving said first plurality of wireless mobile devices and said second plurality of wireless mobile devices being served by said portion of said wireless network.

38. The system of claim 36, wherein said second application formed in hardware, software, firmware, or some combination thereof on the management server includes instructions for generating an estimate of the remaining unused or available upload capacity of that portion of the wireless network serving said first plurality of wireless mobile devices and said second plurality of wireless mobile devices being served by said portion of said wireless network.

39. The system of claim 35, wherein said first plurality of wireless mobile devices are configured to include a first mode of operation wherein said upload capacity is regulated based on said generated estimate of the remaining unused or available upload capacity of that portion of the wireless network serving said first plurality of wireless mobile devices and said second plurality of wireless mobile devices, and a second mode of operation wherein said upload capacity is not regulated based on said estimate of the remaining unused or available upload capacity of that portion of the wireless network serving said first plurality of wireless mobile devices and said second plurality of wireless mobile devices.

40. The system of claim 35, wherein said first plurality of wireless mobile devices are configured to include a first mode of operation wherein said upload capacity is regulated based on said generated estimate of the remaining unused or available upload capacity of that portion of the wireless network serving said first plurality of wireless mobile devices and said second plurality of wireless mobile devices, and a second mode of operation wherein said upload capacity is regulated based on said estimate of the remaining unused or available upload capacity of that portion of the wireless network serving said first plurality of wireless mobile devices and said second plurality of wireless mobile devices; and wherein at least one or the other of said first mode of operation and said second mode of operation is regulated to provide increased upload capacity.

41. The system of claim 35, wherein said wireless network provides access by requiring payment for the use thereof, wherein said first plurality of wireless mobile devices whose upload capacities are regulated are regulated in accordance with a first payment scheme, and wherein at least some of said second plurality of wireless mobile devices that comprise wireless mobile devices that are not regulated as to their usage of said wireless network upload capacity provide payment in accordance with a second payment scheme.

42. The system of claim 39, wherein said wireless network provides access by requiring payment for the use thereof, wherein said first plurality of wireless mobile devices whose upload capacities are regulated based on said generated estimate are regulated in accordance with a first payment scheme for operating in said first mode of operation, and wherein said first plurality of wireless mobile devices operating in said second mode of operation are provided access to said network in accordance with a second payment scheme.

43. The system of claim 40, wherein said wireless network provides access by requiring payment for the use thereof, wherein said first plurality of wireless mobile devices are regulated in accordance with a first payment scheme for operating in said first mode of operation, and wherein said first plurality of wireless mobile devices are regulated in accordance with a second payment scheme for operating in said second mode of operation.

44. The system of claim 41, wherein said first plurality of wireless mobile devices operate on said wireless network based on implementation of said first application to regulate upload capacity usage.

45. The system of claim 41, wherein said first plurality of wireless mobile devices are configured to have restricted usage of said network upload capacity based on said upload capacity corresponding with an estimate of the portion of said network serving said first plurality of wireless mobile devices at the time at which a communication from a said one of said first plurality of wireless mobile devices is made.

46. The system of claim 41, wherein said at least some of said second plurality of wireless mobile devices that comprise wireless mobile devices that are not regulated as to their usage of said wireless network upload capacity are given priority over said other wireless mobile devices operating on said wireless network for upload capacity when conditions constrain said network upload capacity.

47. The system of claim 34, wherein at least some of said other wireless mobile devices operating on said network are prioritized in their use of said network upload capacity.

48. The system of claim 47, wherein said other wireless mobile devices operating on said network are each assigned a device status, wherein said device status is a function of revenue generation from said device communications activity, and wherein at least some of said other wireless mobile devices operating on said network are prioritized in their use of said network upload capacity based on said device status.

49. The system of claim 35, wherein at least one or more of each of said plurality of wireless mobile devices is assigned a device status, wherein said device status is a function of revenue generation from said device communications activity, and wherein said plurality of wireless mobile devices are prioritized in their use of said network upload capacity based on said device status.

50. The system of claim 34, wherein said plurality of wireless mobile devices comprise a plurality of law enforcement body cameras.

51. The system of claim 50, wherein said law enforcement body cameras are automatically operated within said system of wireless mobile devices to prioritize transmissions from said law enforcement body cameras communicating on said wireless network over other wireless mobile devices using said network.

52. The system of claim 50, wherein said law enforcement body cameras are automatically configured to transmit communications by implementing said first application to adjust said video parameters in relation to said estimate of said available or unused upload capacity of the wireless network portion serving said law enforcement body camera.

53. The system of claim 50, wherein said management server includes software with instructions for regulating the communications from a said law enforcement body camera in relation to said estimate of said available or unused upload capacity of the wireless network portion serving said law enforcement body camera.

54. The system of claim 53, wherein said management server includes software with instructions for regulating the communications from a said law enforcement body camera in relation to said estimate of said available or unused upload capacity of the wireless network portion serving said law enforcement body camera, and wherein a plurality of law enforcement body cameras are regulated to maintain the information streams, including the upload video stream load, within the estimated upload capacity for said portion of said wireless network serving said law enforcement body cameras.

55. A method for managing a load of a wireless network to minimize a probability of the wireless network becoming overloaded, and to maximize the probability of successful operation of the wireless network for wireless mobile devices communicating on the network and transporting on the network data associated with applications requiring significant resources from the wireless network, comprising:
 a) providing a first application comprising a downloadable mobile device application operative, when installed on a compatible wireless mobile device, for configuring upload capacity requirements for device operations that require capacity of the wireless network;
 b) providing a management server configured for communications with said wireless mobile device; said management server including a second application formed in hardware, software, firmware, or some combination thereof for operative implementation by said management server;
 c) operating a first wireless mobile device configured for communications with said wireless network, said first wireless mobile device being served by at least a portion of said wireless network;
 d) implementing with said management server second application the steps, continuously, intermittently or when demanded, of:
  (i) making a measurement of signal strength of a signal received by the first wireless mobile device, or (ii) making a measurement of signal power in specific frequency bands being employed by the first wireless mobile device in its communications mode over the wireless network, or (iii) making both (i) and (ii), and (iv) making a measurement of time of day, and (v) making a measurement of a location of said first wireless mobile device either by using a global positioning system to determine latitude and longitude or by ascertaining a unique identifier of a fixed antenna and sub-zone or sector of that antenna and/or transceiver providing wireless service to the first wireless mobile device, or by both, and (v) optionally creating a test block of data; and
 e) generating with said management server second application an estimate of a remaining unused or available upload capacity of that portion of the wireless network serving said first wireless mobile device and other wireless mobile devices being served by said portion of said wireless network, said upload capacity being a direction where data travels from the wireless mobile device, over the wireless network and to the server, and
 f) providing to other wireless mobile device applications an estimate of the available or unused upload capacity of the wireless network portion serving said wireless mobile device.

56. The method of claim 55, wherein said wireless mobile device includes a mobile device second application operative for conducting device operations that communicate using the capacity of said wireless network; and wherein the method includes implementing with said wireless mobile device second application communications using said first wireless mobile device.

57. The method of claim 56, including implementing with said wireless mobile device second application uploading of real-time video from said first wireless mobile device, and reducing an upload rate of said real-time video uploading by managing with said first application video parameters of said real-time video by adjusting said video parameters to reduce the upload capacity required to communicate the video from said first wireless mobile device.

58. The method of claim 57, wherein adjusting said video parameters is carried out in relation to said estimate of said available or unused upload capacity of the wireless network portion serving said first wireless mobile device.

59. The method of claim 58, wherein adjusting said video parameters is carried out to maximize the available upload capacity to said first wireless mobile device in relation to said estimate of said available or unused upload capacity of the wireless network portion serving said first wireless mobile device.

60. The method of 57, wherein said managing of video parameters of said real-time video comprises managing one or more parameters selected from the group consisting of video frame rate, resolution, color and other factors pertaining to the real-time video.

61. The method of claim 60, wherein adjusting said video parameters is carried out to maximize the available upload capacity to said first wireless mobile device in relation to said estimate of said available or unused upload capacity of the wireless network portion serving said first wireless mobile device.

62. The method of 58, wherein said managing of video parameters of said real-time video comprises managing one or more parameters selected from the group consisting of video frame rate, resolution, color and other factors pertaining to the real-time video.

63. The method of claim 55, wherein said downloadable mobile device application is a first application formed in hardware, software, firmware, or some combination thereof provided on said wireless mobile device.

64. The method of claim 55, including:
operating said first wireless mobile device to run a second device application, said first wireless mobile device having a processing unit and a transceiver,
operating said server application and communicating to said first device said estimate of the wireless network upload capacity;
processing with said first wireless mobile device processing unit the estimated upload capacity and determining when said second device application requires utilization of said network for communication of data,
modifying the planned volume or rate usage of the wireless network's upload capacity for said device application communications in view of any limitations or load effects which immediately exist with respect to communications between said first wireless mobile device at a particular place and time;
wherein said estimated upload capacity estimates limitations or load effects which immediately exist with respect to communications between said first wireless mobile device and said portions of said wireless network serving said first wireless mobile device at a particular place and time.

65. A wireless mobile device comprising:
a) a wireless RF transceiver;
b) a processing unit;
c) a storage component;
d) said storage component configured with software including instructions for implementing the steps, continuously, intermittently or when demanded, of:
(i) communicating through the wireless network or portion thereof serving said wireless mobile device a data block that includes a time of transmission and location information of the location of said wireless mobile device;
(ii) receiving information through said wireless network or portion thereof comprising an upload capacity for said wireless network or portion thereof;
(iii) regulating one or more device applications that implement transmission of information from said wireless mobile device in relation to said received upload capacity;
e) wherein said wireless mobile device is configured to communicate with a management server that includes a second application formed in hardware, software, firmware or some combination thereof, provided in conjunction with said management server,
f) wherein said wireless mobile device is configured to transmit data comprising a heartbeat at a predetermined time, with said predetermined time determined by the wireless mobile device;
g) wherein said management server second application is configured to continuously, intermittently or when demanded, make a measurement of signal strength of the signal received by the wireless mobile device, or (ii) making a measurement of signal power in specific frequency bands being employed by the wireless mobile device in its communications mode over the wireless network, or (iii) making both (i) and (ii), and (iv) making a measurement of time of day, and (v) making a measurement of a location of said wireless mobile device either by using a global positioning system to determine latitude and longitude or by ascertaining unique identifier of a fixed antenna and sub-zone or sector of that antenna and/or transceiver providing wireless service to the mobile device, or by both, and (v) optionally creating a test block of data;
h) wherein the second application formed in hardware, software, firmware, or some combination thereof on the management server includes instructions for generating an estimate of a remaining unused or available upload capacity of that portion of the wireless network serving said wireless mobile device and other wireless mobile devices being served by said portion of said wireless network, said upload capacity being the direction where data travels from the wireless mobile device, over the wireless network and to the server, for purpose of providing other applications an estimate of available or unused upload capacity of the wireless network portion serving a particular mobile device; and
i) wherein said wireless mobile device is configured to transmit data comprising a heartbeat at a predetermined time, with said predetermined time determined by the wireless mobile device.

66. The device of claim 65, wherein said transmission of information comprises video.

67. The device of claim 66, wherein said device includes a camera.

68. The device of claim 67, wherein said device comprises a body camera.

69. The device of claim 65, wherein said wireless mobile device includes at least one application thereon that is configured to enable the wireless mobile device to upload a large amount of data or a sustained high rate of data upload to a server; and wherein said wireless mobile device is configured to regulate the transmission rate or quality of said upload said large amount of data or a sustained high rate of data in relation to said upload capacity that said wireless mobile device is configured to receive.

70. The device of claim 65, wherein said upload capacity is generated using a database comprising the upload capacity of the network.

71. The device of claim 70, wherein said upload capacity of the network in said database comprises the capacity at the time of said device communication of said data block.

* * * * *